United States Patent
Owerko et al.

[11] Patent Number: 5,907,238
[45] Date of Patent: May 25, 1999

[54] POWER SOURCE MONITORING ARRANGEMENT AND METHOD HAVING LOW POWER CONSUMPTION

[75] Inventors: John R. Owerko; John C. Eichenseer; Alexander N. Theodorou, all of Albuquerque, N.M.

[73] Assignee: TRW Inc., Lyndhurst, Ohio

[21] Appl. No.: 08/990,111

[22] Filed: Dec. 12, 1997

Related U.S. Application Data

[60] Provisional application No. 60/032,910, Dec. 16, 1996.
[51] Int. Cl.$^6$ ...................................................... H02J 7/00
[52] U.S. Cl. ........................................... 323/349; 320/136
[58] Field of Search ........................... 323/349; 320/135, 320/127, 153, 136

[56] References Cited

U.S. PATENT DOCUMENTS

| | | | |
|---|---|---|---|
| 5,372,898 | 12/1994 | Atwater et al. . | |
| 5,487,956 | 1/1996 | Bromley et al. | 429/90 |
| 5,631,540 | 5/1997 | Nguyen | 320/30 |
| 5,646,503 | 7/1997 | Stockstad | 320/13 |
| 5,692,203 | 11/1997 | Grodevant | 395/750 |

*Primary Examiner*—Adolf Deneke Berhane
*Attorney, Agent, or Firm*—Tarolli, Sundheim, Covell, Tummino & Szabo

[57] ABSTRACT

An electronic circuit and system (1) incorporating a battery system (30), power-discharge sensing circuitry (40) and sleep circuitry (10) all in electrical communication with each other. The sleep circuitry (10) detects the presence or absence of an external load on the battery system (30) by sensing changes in voltage across the battery's protection diode (D3). When no external load is present, the sleep circuitry (10) controls the power-discharge sensing circuitry (40) in an extremely low current mode (e.g., current is consumed by sleep circuitry (10), but no power supplied to power-discharge sensing circuitry (40)). This mode is also referred to as a sleep mode. Upon detection of a small voltage drop on the battery's protection diode (D3) caused by a power-consuming load on the battery, the sleep circuitry (10) supplies power to the power-discharge sensing circuitry (40). When the power-discharge sensing circuitry (40) is thus activated, the amount of power removed from the battery system (30) can then be monitored. When the load is removed, the power-discharge sensing circuitry (40) is again placed into the sleep mode.

14 Claims, 16 Drawing Sheets

| BINARY COUNT (COUNTER OUTPUTS) | | | | Q17 THROUGH Q1 (COUNT OVERFLOW STATES) | DECIMAL COUNT EQUIV. | % POWER REMOVED | % POWER REMAINING (DISPLAY) |
|---|---|---|---|---|---|---|---|
| Q21 | Q20 | Q19 | Q18 | | | | |
| 0 | 0 | 0 | 0 | ALL 0'S | 0 | 0 | |
| 0 | 0 | 0 | 1 | | | | < 70 |
| 0 | 0 | 1 | 0 | ALL 1'S | 393215 | 30 | |
| 0 | 0 | 1 | 1 | ALL 0'S | 393216 | 30 | |
| 0 | 1 | 0 | 0 | | | | |
| 0 | 1 | 0 | 1 | | | | 70 TO 20 |
| 0 | 1 | 1 | 0 | | | | |
| 0 | 1 | 1 | 1 | ALL 1'S | 1048575 | 80 | |
| 1 | 0 | 0 | 0 | ALL 0'S | 1048576 | 80 | |
| 1 | 0 | 0 | 1 | ALL 1'S | 1310719 | 100 | > 20 |
| 1 | 0 | 1 | 0 | ALL 0'S | 1310720 | 100 | |
| 1 | 0 | 1 | 1 | | | | |
| 1 | 1 | 0 | 0 | | | | |
| 1 | 1 | 0 | 1 | | | | |
| 1 | 1 | 1 | 0 | | | | |
| 1 | 1 | 1 | 1 | | | | |

Fig.15

POWER SOURCE MONITORING ARRANGEMENT AND METHOD HAVING LOW POWER CONSUMPTION

RELATED APPLICATION

This application claims the benefit of U.S. Provisional Application No. 60/032,910, filed Dec. 16, 1996.

FIELD OF THE INVENTION

The present invention relates to an electronic circuit and system that significantly reduces the need for continuous power to continuously monitor the amount of power remaining in a power source, such as a battery arrangement, regardless of whether an external load is attached to the power source. Specifically, the present invention relates to a battery capacity measurement system for a battery, a micro-power sleep circuit and power-discharge sensing circuitry.

The present invention operates on microamperes of quiescent current and is capable of detecting the presence of external loads placed on the battery. Upon detection of an external load on the battery, a micro-power sleep circuit controls the operation of a power-discharge sensing circuit, by controlling the amount of power to and from the power-discharge sensing circuit, to thereby significantly reduce the need for continuous power to monitor the battery's power capacity. The present invention is useful for any application, which requires careful monitoring and management of power in a battery.

BACKGROUND OF THE INVENTION

In the field of battery systems, there are many instances where it is preferable or necessary to keep track of the amount of power available in a battery before, during, and after the battery is subject to an external load. If the amount of battery power is effectively monitored, users are able to monitor further use of the battery and replace or recharge a depleted battery before a minimum useful power threshold is reached or the battery is completely discharge. As those of skill in the art realize, the ability to continuously monitor the amount of power remaining in a power source is almost a necessity in various end-use applications, such as military applications. Proper monitoring of battery power is also of concern when the battery remains unused for many years.

Some end-use applications, such as military applications, employ a battery with a built-in protection diode (designated as D3 in FIG. 2) and a fuse of conventional design. The battery's protection diode is typically a high-current Schottky diode. The protection diode and fuse are in electrical connection with the battery and serves to protect the battery from electrical surge events or related harmful events (attempts to recharge a primary battery). Most electronic devices on the market today, which consume battery power, incorporate such a protection diode in series with a fuse. If no protection diode or fuse exist on the battery, these can usually be added with minimal impact to the battery. Further, due to additional power requirements, some end-use applications require more than one battery. When one or more batteries in electrical connection with each other are used, the combination is generally known as a "battery string". Those skilled in the art know that the term "battery" includes one or more batteries.

Most users of a battery, however, do not take advantage of all power remaining in the battery because there is no convenient, economical or highly accurate way to monitor the power level in the battery. Rather, users are apt to replace the battery or continuously recharge them in an attempt to maintain adequate power for an end-use application (or "load"). Successive replacement of batteries prior to consumption of all available power is cost inefficient. Continuously recharging the batteries may result in what is known as the "memory effect", wherein the battery's ability to retain charge diminishes significantly over time.

Portable devices exist for measuring the charge capacity available on a battery. However, such measuring devices are expensive, are usually larger than the batteries themselves, and do not provide the level of accuracy required for many end-use applications (such as, for example, military equipment).

Smaller devices exist that are capable of monitoring the discharge rate of a battery. An example of such a battery capacity discharge monitor is disclosed in U.S. Pat. No. 5,372,898 to Atwater et al. A diagram of the Atwater et al. device is shown in FIG. 1. The device of Atwater et al. includes a sense resistor of minimal resistive force, sense circuitry, counter circuitry and miscellaneous logic circuitry. In order to determine the amount of power capacity remaining in a high-powered battery system, the Atwater et al. device monitors the current flow from the battery to an attached load through the sensing resistor. In operation, the sensing resistor is placed in serial electrical connection with the battery (or batteries connected in series). When voltage is detected across the sensing resistor due to the presence of a load on the battery, the voltage signal is then amplified and integrated over time to obtain an average current value. The resulting integrated signal is then applied to a capacitor in the miscellaneous logic for storage. Whenever a predetermined threshold voltage is achieved across the capacitor, the sense circuitry operates to discharge the capacitor and increase the value in the counter circuitry. When the capacitor is discharged, this event represents the discharge of one coulomb of power from the battery. Atwater et al.'s counter circuitry maintains count of the number of discharge cycles (or, the number of coulombs of power removed from the battery). The counter circuitry is electrically connected to light emitting diodes to indirectly represent the amount of power dissipated from the battery.

Circuitry that senses the discharge rate from a battery, such as that disclosed by Atwater et al., is deficient for several reasons. First, a power-discharge sensing circuit contributes greatly to the amount of power dissipated from the battery being monitored because the voltage across the sensing resistor must be continuously monitored. While this problem may not exist with high-power batteries, problems do exist in those instances where the end-use application requires lower power batteries.

Second, high-power discharge sensing circuits, like that disclosed in Atwater et al., require active (e.g., always "ON") circuitry to enable the sense circuitry and counter circuitry to operate. Such active circuitry is purposely designed to continuously draw power from the battery, and is not easily disabled because the circuitry is located in a housing with the battery. Thus, in order to operate, these circuits require continuous power from the same power source these circuits are designed to monitor. Such continuous consumption of power contributes or greatly reduces the operable life of the battery. Third, these types of battery sensing methods incorporate electronic components which draw a large amount of current from the battery, whether a load is placed on the battery or not. Finally, discrete MOSFETs used in these circuits are expensive.

SUMMARY OF THE INVENTION

The present invention overcomes the prior art deficiencies by providing an electronic circuit for use with a battery system which is reliable, low-cost and capable of effectively controlling power-discharge sensing devices (e.g., the Atwater et al. device) both when a load is placed on the battery and when the load is removed. The present invention also intends to supplement power-discharge sensing devices such as disclosed in Atwater et al. The present invention includes a minimal number of conventional, inexpensive, off-the-shelf bipolar junction transistors, diodes and resistors. The use of particular transistors and diodes, along with the proper selection of resistor values, allows the user to adjust the present invention's power consumption and sensitivity to detect voltage drops across a sense resistor. As such, the present invention is useful on a wide variety of applications in a wide variety of environments. Further, selection of the proper electrical components according to the present invention permits its use for both low-power (low current) requirements as well as high-power (high current) requirements. Moreover, the present invention is capable of detecting the reduced amount of power available in a battery over an operating temperature range of −40 to +85 degrees Celsius and voltages ranging from four volts to sixteen volts. As those of skill in the art realize, with the proper selection of electrical components designed for extended temperature range, the present invention can operate in a temperature range of −55 to +125 degrees Celsius.

In view of the foregoing, it is an object of the present invention to provide a battery capacity measurement system having a power-discharge sensing circuitry and micro-power sleep circuitry in electrical communication with a battery. The power-discharge sensing circuitry, in conjunction with the sleep circuitry, is capable of monitoring the power remaining in the battery.

It is an object of the present invention to provide a battery capacity measurement system which includes reliable, low-cost, micro-power electronic circuitry electrically connected to a battery or string of batteries which is capable of reducing or completely eliminating the battery power consumed by the electronic circuitry of the measurement system when no external load is attached to the battery or batteries being monitored.

It is an object of the present invention to provide a battery capacity measurement system having conventional, low-cost transistors and diodes and other electrical components operating in a micro-power mode in electrical communication with a battery that is capable of controlling the battery power consumed by electronic components in the battery capacity measurement system when an external load is attached to or removed from the battery or batteries being monitored.

It is an object of the present invention to provide a battery capacity measurement system adapted to detect slight voltage changes across an existing projection diode or other applicable voltage dropping circuitry (i.e., a resistor) in a battery due to the presence or absence of an external load on the battery and provide accurate battery discharge rate information to the user.

It is a further object of the invention to disclose a battery capacity measurement system that is adapted for controlling power consumption to the battery capacity measurement system over a wide range of temperatures and battery voltages.

It is also an object of the present invention to provide an improvement to prior state-of-charge battery indicators, the improvement including micro-power electronic circuitry adapted to control the battery power consumed by prior art state-of-charge battery indicators connected to a battery or string of batteries when an external load is attached to or removed from the battery being monitored.

It is also an object of the present invention to provide an improvement to prior art state-of-charge battery indicators, the improvement including micro-power electronic circuit means adapted to control the battery power consumed by a power-discharge sensing device connected to a battery or batteries over a voltage range of 4 to 16 volts and over a temperature range of −40 to +85 degrees Celsius.

The present invention is a battery capacity measurement system incorporating a battery, power-discharge sensing circuitry, and micro-power sleep circuitry, all in electrical communication with each other. The micro-power sleep circuitry detects the presence or absence of an external load on the battery by sensing changes in voltage across the battery's protection diode. When no external load is present, the capacity measurement system controls the power-discharge sensing circuitry in an extremely low current (micro-power or sleep) mode, with current being supplied only to the power-discharge sensing circuitry, if necessary. While the power-discharge sensing circuitry is in the micro-power sleep mode, the total quiescent current consumption of the sleep circuitry is less than approximately 10 microamperes. Further, while in the sleep mode, the present invention still supplies a small amount of current to the power-discharge sensing circuitry's counter (and miscellaneous logic, if required) to allow the counter to retain an accumulated count value. Thus, when no load is placed on the battery, only a very small amount of current is needed for continuous monitoring of the battery's remaining power.

Upon detection of a small voltage drop on the battery's protection diode (thereby representing a load on the battery), the micro-power sleep circuitry, in accordance with the present invention, supplies power to the power-discharge sensing circuitry. When the power-discharge sensing circuitry is thus activated, the amount of power removed from the battery can then be monitored. While the power-discharge sensing circuitry is in the active mode, the total current consumption of the micro-power sleep circuitry and the power-discharge sensing circuitry is no more than 500 microamperes. When the battery load is removed, the power-discharge sensing circuitry is again placed into a sleep mode. The present invention provides a unique and novel approach to the proper control and operation of microelectronic power-discharge sensing devices.

In an alternate embodiment, the present invention improves upon prior art state-of-charge battery indicators by employing micro-power sleep circuitry which is in electrical communication with prior art state-of-charge battery indicators and a battery. The sleep circuitry detects the presence or absence of an external load on the battery by sensing changes in voltage across the battery's protection diode, and similar to the preferred embodiment described previously, is adapted to control the operation of the prior art state-of-charge battery indicator.

BRIEF DESCRIPTION OF THE DRAWINGS

FIG. 15 illustrates the presentation table that represents a specific state of charge indication level for the connected battery and can be modified as required.

DESCRIPTION OF THE PREFERRED EMBODIMENT

Figure 1:
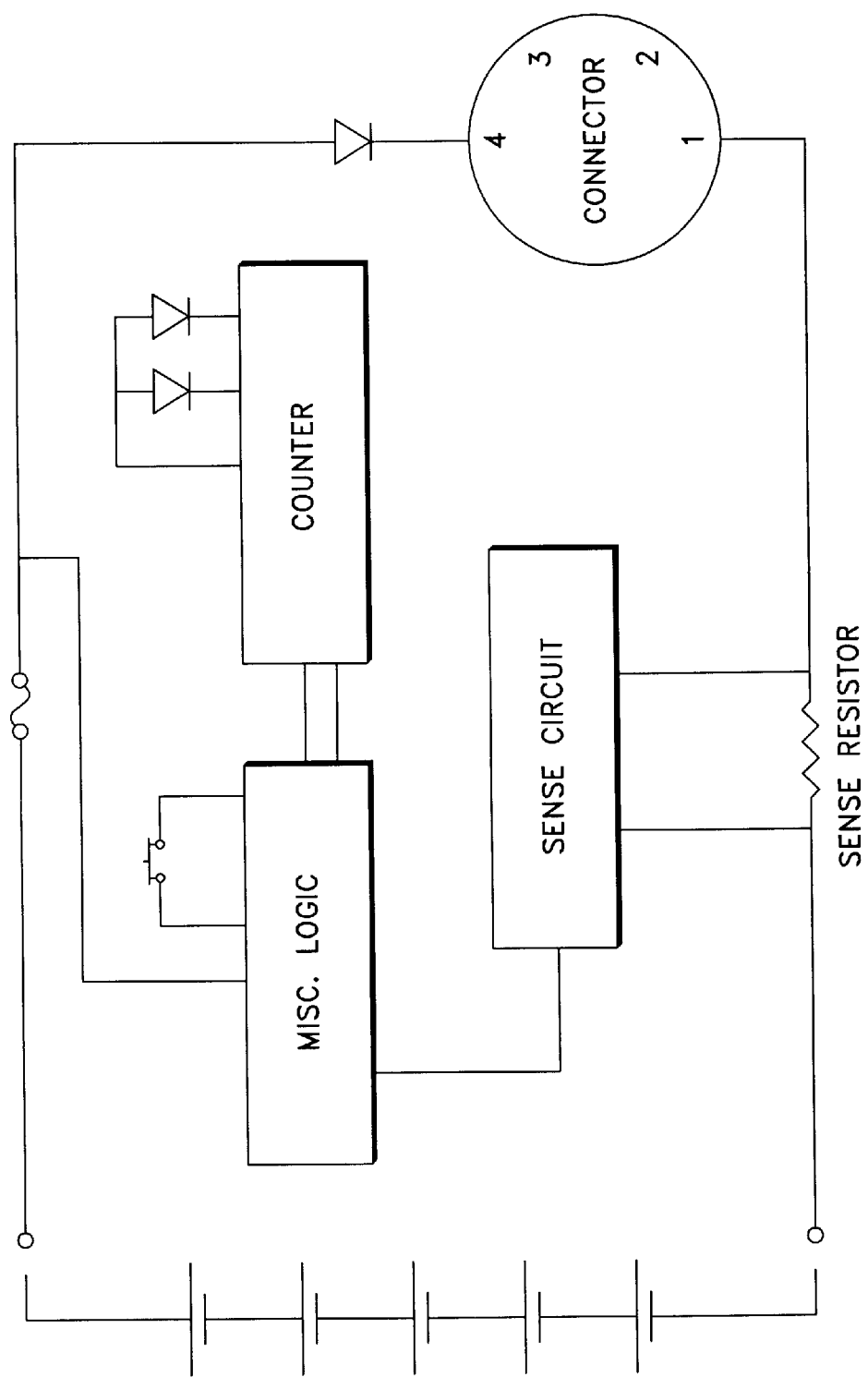
FIG. 1 illustrates prior art battery capacity discharge monitor.
Figure 2:
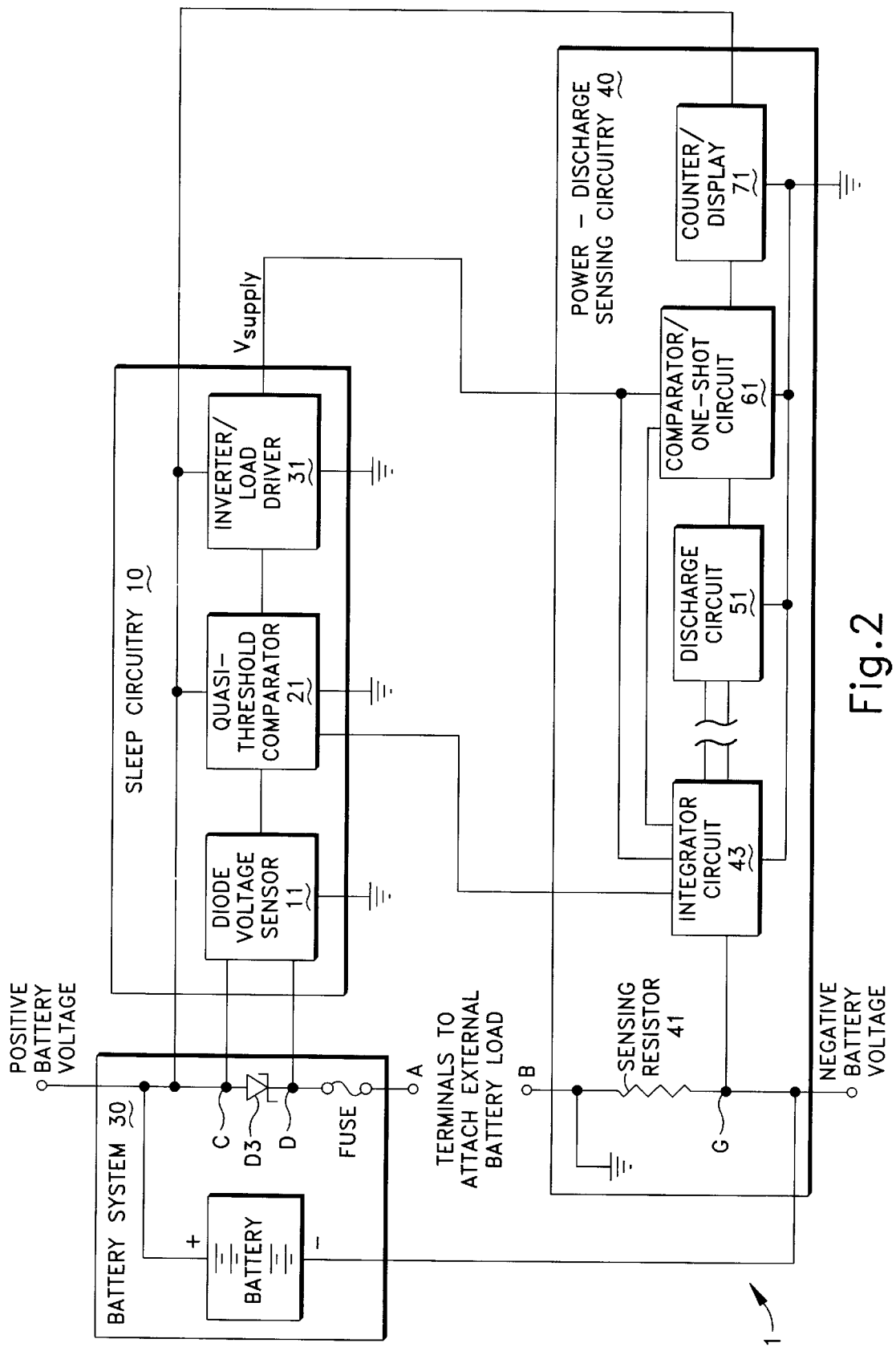
FIG. 2 illustrates a block diagram of the present invention.

FIG. 2 illustrates the first preferred embodiment of the present invention. Battery capacity measurement system 1 includes sleep circuitry 10, power-discharge sensing circuitry 40 and battery system 30. Battery system 30 includes a single battery or a string of batteries having a protection diode D3 and a fuse FUSE in series with the battery or string of batteries. Sleep circuitry 10 includes three major circuit components in electrical communication with each other: (1) diode voltage sensor 11, (2) quasi-threshold comparator 21, and (3) inverter/load driver 31. Power-discharge sensing circuitry 40, as seen in FIG. 2, consists of primarily five major component: (1) sensing resistor 41; (2) integrator circuit 43; (3) discharge circuit 51; (4) comparator/one shot circuit 61; and (5) a counter/display unit 71.

Figure 3:
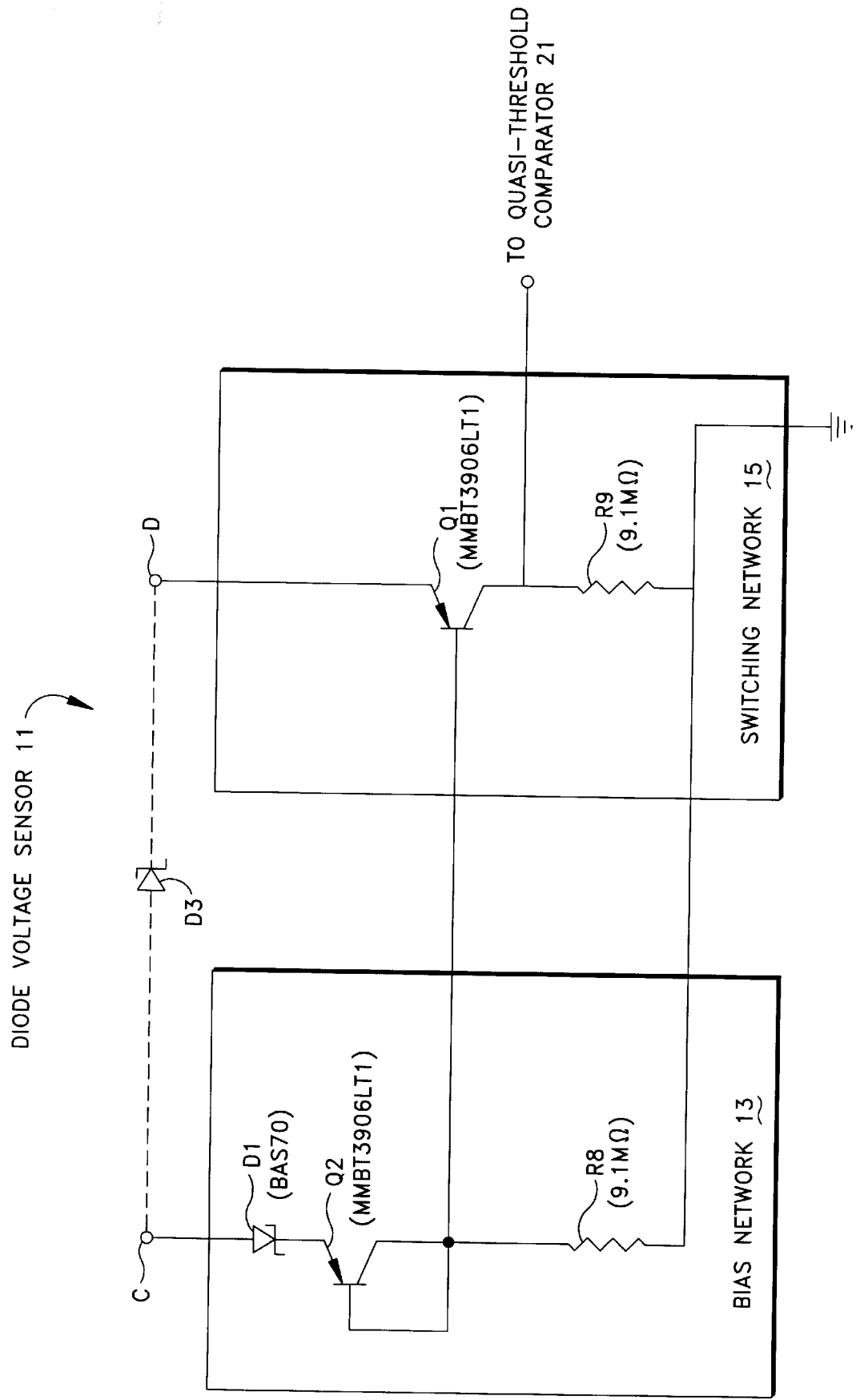
FIG. 3 illustrates the diode voltage sensor circuit in the sleep circuit of the present invention.

Diode voltage sensor 11 senses the increased forward voltage drop across the existing protection diode D3. This voltage drop is induced when a load is placed on battery system 30 (i.e., across terminals A–B). As seen in FIG. 3, diode voltage sensor 11 is a common-base/switching amplifier having bias network 13 (identified as Q2, R8, and D1 in FIG. 3) electrically connected to switching network 15 (identified as Q1, R9, and D3 in FIG. 3). As shown in FIGS. 2 and 3, protection diode D3 is electrically located between bias network 13 and switching network 15 (see terminal points C and D). The diode voltage sensor 11 is biased in the lower portion of the saturation region. Under quiescent conditions (i.e., no battery load or no load current is present across protection diode D3), a near equality of currents flowing through bias network 13 and switching network 15 is achieved by employing equal values of collector resistors R8 and R9. This near equality of current flow occurs since both R8 and R9 are very large and equal values.

With resistor R8 and resistor R9 being of equal resistance values, the slightly smaller voltage drop across resistor R8 yields a slightly smaller current through bias network 13. The base-emitter ($V_{BE,Q2}$ voltage drop of PNP transistor Q2 is used to establish the base-emitter bias voltage for PNP transistor Q1. The use of like PNP transistors Q1 and Q2, and a near equality of the quiescent currents flowing through transistors Q1 and Q2, yields substantially similar device operating parameter characteristics between transistors Q1 and Q2, and further yields circuit stability and temperature tracking for Q1 and Q2. As those skilled in the art realize, with proper biasing, network diode D1 (preferably a small signal Schottky diode) and the existing large-current protection diode D3 exhibit similar temperature coefficients. Therefore, the configuration of, and biasing techniques applied to, diode voltage sensor 11 provides temperature stability and prevents unwanted switching conditions over a wide temperature range.

In quiescent (no-load) states, there is a slightly larger voltage drop across bias network diode D1 than across protection diode D3 thus reducing overall circuit sensitivity and thereby preventing unwanted low current switching. While approximately the same current flows through these diodes, the difference in voltages across diodes D1 and D3 results from the difference in the internal junction areas for these diodes. Diode D3 has a larger junction area and less forward resistance than diode D1.

The base voltage ($V_{BB}$) for transistor Q2 and transistor Q1 are referenced to the positive battery voltage through diode D1. As such, bias network 13 maintains a firm (nearly consistent) base voltage ($V_{BB}$) at transistor Q1 regardless of the presence or absence of a load on the battery being monitored. Applying standard techniques, summing the voltages around the base loop of the two transistors Q1 and Q2, and solving for the base-emitter voltage ($V_{BE}$) of transistor Q1 yields:

$$V_{BE,Q1} = V_{D1} + V_{BE,Q2} - V_{D3}$$

Where:

$V_{BE,Q1}$=base-emitter voltage drop for PNP transistor Q1;

$V_{D1}$=forward diode voltage drop for diode D1;

$V_{BE,Q2}$=base-emitter voltage drop for PNP transistor Q2; and $VD_3$=forward diode voltage drop for diode D3.

Figure 4:
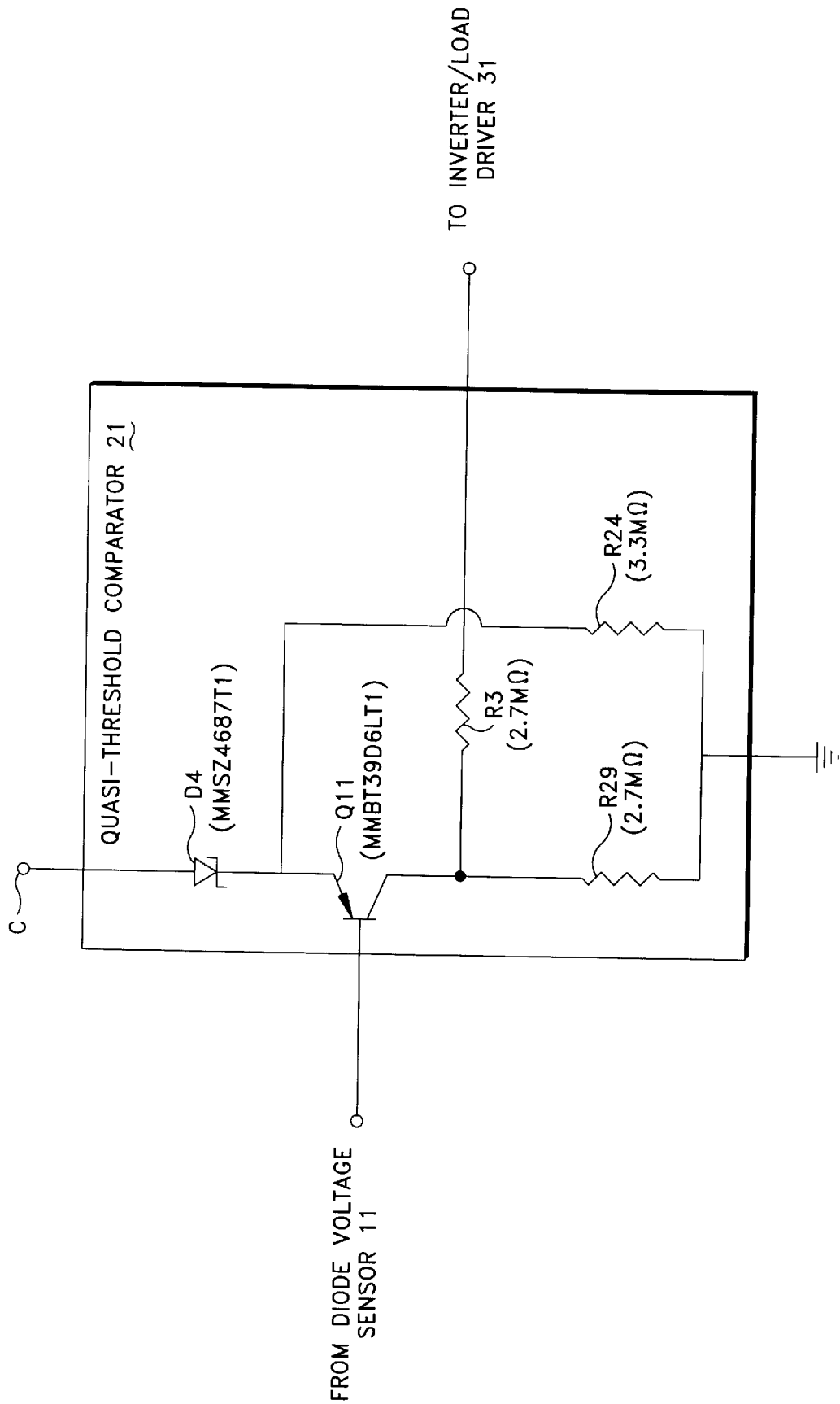
FIG. 4 illustrates the quasi-threshold comparator circuit in the sleep circuit of the present invention.

Diode voltage sensor 11 does not require any additional component(s) to be added in series with the battery load because the diode voltage sensor makes use of the built in protection diode D3 normally found in battery system 30. When a load is applied to battery system 30 across terminals A and B (as seen in FIG. 2), the resulting current through protection diode D3 induces an increased forward voltage drop ($V_{F,D3}$) across protection diode D3. With the base-emitter voltage drop ($V_{BE,Q2}$) for transistor Q2 and forward voltage drop ($V_{F,D1}$) for diode D1 being held constant, the increased forward voltage drop across protection diode D3 forces a reduction in the base-emitter voltage ($V_{BE,Q1}$) of transistor Q1. With transistor Q1 biased in the lower portion of the saturation region, the load induced voltage drop (increased forward voltage drop) across protection diode D3 forces the base-emitter voltage ($V_{BE,Q1}$) of switching transistor Q1 toward its minimum base-emitter "ON" voltage ($V_{BE,Q1\ ON}$) This, in turn, forces transistor Q1 into the cutoff region and causes a loss of collector current in Q1. The loss of collector current causes a high-to-low transition in the collector voltage of Q1. This high-to-low voltage transition at the collector of Q1 provides a path for base current to transistor Q11, and thereby turns "ON" quasi-threshold comparator 21 as seen in FIG. 4. In other words, the high-to-low transition at the collector of Q1 triggers the quasi-threshold comparator. As those skilled in the art will realize, the output voltage transition from Q1 can also be electrically interfaced to other voltage sensitive circuits to trigger other operations.

The diode voltage sensor is adjusted to set the desired threshold/switching (full-on) current level through existing projection diode D3. This is determined by the ratio of the quiescent condition, forward voltage drops across diodes D1 and D3 and the ratios of bias to switching network current.

Quasi-threshold comparator circuit 21, as seen in FIG. 4, includes PNP transistor Q11, resistors R29 and R24, and Zener diode D4. When a load is applied to battery system 30, the reduction in collector current to or very near cutoff (and resulting reduction in collector voltage) from switching transistor Q1 is used to control the operation of quasi-threshold comparator circuit 21. Zener diode D4 and resistor R24 are used to reverse bias the emitter of transistor Q11 at approximately one Zener diode voltage drop below the positive battery voltage. The base-emitter junction of transistor Q11 is reverse-biased by the Zener voltage drop of diode D4. Reverse biasing the emitter of transistor Q11 establishes a voltage threshold, which is below the positive battery voltage by one Zener diode voltage in series with the base-emitter on ($V_{BE,Q11\ ON}$) of transistor Q11. Therefore, when the initial threshold is reached (resulting from a reduction in the collector voltage of PNP transistor Q1), a small amount of emitter current begins to flow through transistor Q11. This current also flows through Zener diode D4, thereby increasing a voltage drop across diode D4.

Figure 5:
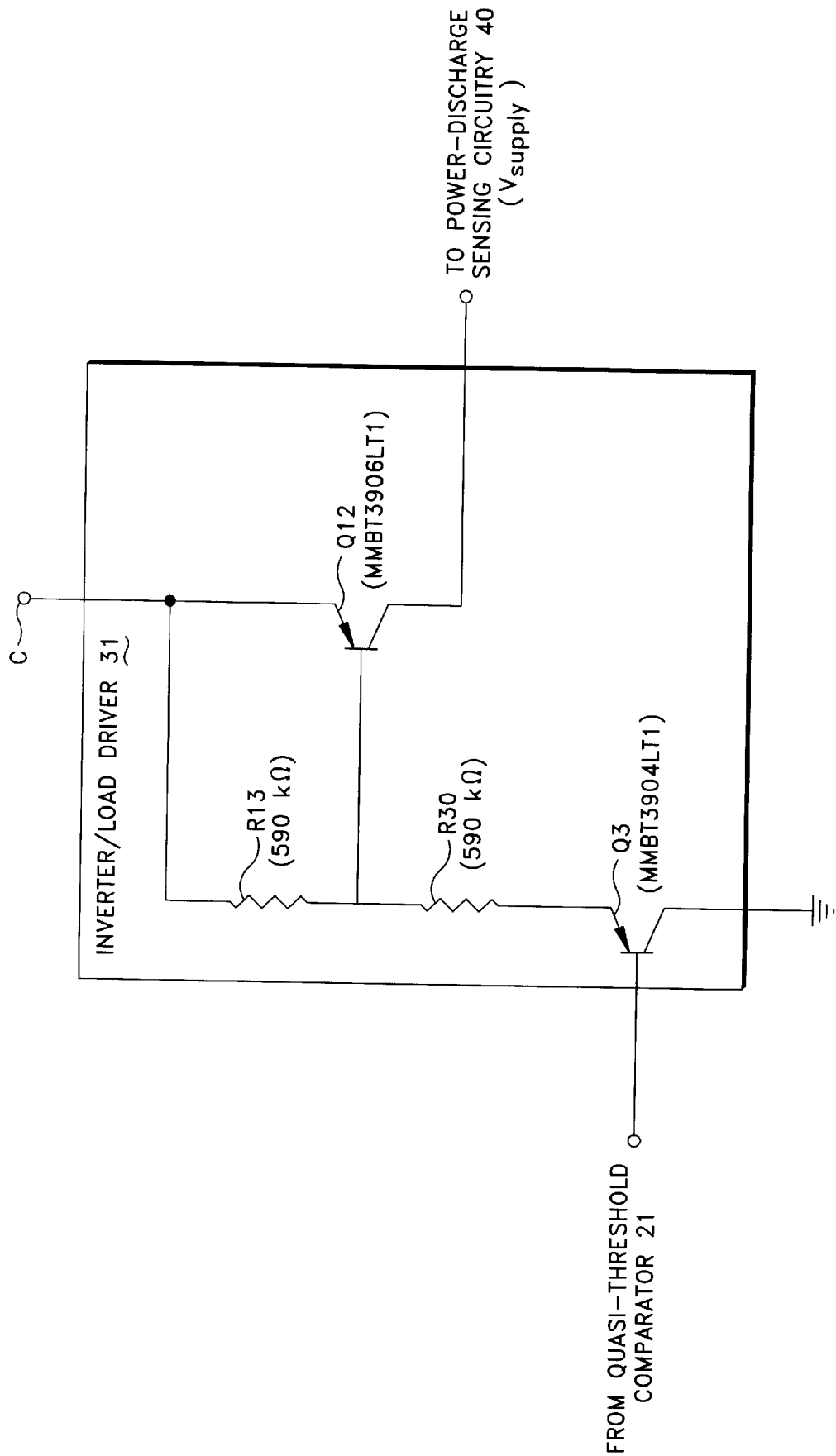
FIG. 5 illustrates the inverter/load driver circuit in the sleep circuit of the present invention.

The voltage drop across Zener diode D4 increases since diode D4 is intentionally biased well below its minimum Zener regulating current (i.e., the bias point is near the "knee" of the diode). The voltage drop across diode D4 continues until the voltage level at the base of transistor Q11 has decreased to a level which allows for a stable Zener voltage and base-emitter "ON" voltage ($V_{BE,Q11\ ON}$) for transistor Q11. Further, while the voltage drop across diode D4 continues (until stability has been reached), the base-emitter "ON" voltage for transistor Q11 is maintained at a minimum (due to negative feedback) and the amount of emitter current, and resulting collector current flowing through transistor Q11 is significantly reduced (very small) and is not sufficient to allow inverter/load driver circuit 31 to turn on. However, once the voltage ($V_z$) of the Zener diode D4 and the base-emitter voltage ($V_{BE\ Q11\ ON}$) of the transistor Q11 have stabilized, and the reduction in the collector voltage level of switching transistor Q1 causes the base-emitter junction of transistor Q11 to therefore become forward biased, and the transistor Q11 is turned "ON". In its on state, transistor Q11 provides base current to NPN transistor Q3 (as seen in FIG. 5), and thereby turns "ON" inverter/load driver circuit 31. The threshold levels for this quasi-threshold comparator are adjusted to allow for stable operation over temperature (to prevent unwanted switching) under worst case conditions.

As seen in FIG. 5, inverter/load driver circuit 31 includes NPN transistors Q3 and Q12 and resistors R13, and R30. When transistor Q11 is "ON", base current is supplied to transistor Q3, and a high to low transition at the collector/voltage divider output (i.e., at the junction of resistors R13 and R30) of inverter circuit Q3, R13, and R30 results. This high to low transition signal is applied to the base of load switching PNP transistor Q12 to turn Q12 on. When Q12 is on, the collector current from Q12 supplies power to the power-discharge sensing circuitry 40 (generally designated as $V_{SUPPLY}$). When transistor Q12 is "ON", the output voltage level at the collector of transistor Q12 is one collector-emitter saturation voltage drop ($V_{CE-SAT}$) below the most positive voltage node. In the illustrated example, the most positive voltage node is at terminal point C.

The very small bias (quiescent) and operating currents, and a single floating reference point, allow the sleep circuitry 10 to be operated over a very wide range of supply voltages. The quiescent and operating voltage points of sleep circuitry 10 are established by the junction voltage drops from the diode and bipolar-junction transistor diodes employed. Large values of resistors yield small currents that change little with battery voltage changes. With insignificant changes in operating voltage points, and by employing substantially similar electrical devices (transistors and diodes), sleep circuitry 10 provides stability and tracking, and any change in the positive battery voltage has little impact on the operation/performance of this circuit. Alternatively, sleep circuitry 10 can be modified to provide much larger output currents by replacing transistor Q12 with another device or electrical component (such as any isolated-gate bipolar junction transistor or power MOSFET).

The proper selection of electrical components employed is an important function of the present invention, as it allows the user to design an appropriate circuit which can function over the desired range of temperatures and battery voltages. In view of the foregoing equations, solving for the base-emitter voltage ($V_{BE,\ Q1}$) Of transistor Q1 the desired components to employ in diode voltage sensor means 11 can be analyzed using classical bipolar-junction transistor models and classical diode equations. This approach demonstrates the relationships between transistor base-emitter voltage ($V_{BE,\ Q1}$) and collector current, forward diode voltage and diode current. Classical models can also be used to determine the effects of temperature on these relationships. Further, classical models provide an analytical design method for establishing the desired circuit operating parameters (over temperature) of quiescent current consumption and the desired switching threshold current levels (such as load current through diode, D3). The use of classical bipolar-junction models, however, does require accurate information for all required device-operating parameters (which is usually obtained from the device manufacturers or device data books). Finally a first order approximation can be used to establish an operating condition base-line from which diode voltage drop detector circuit 11 can be adjusted or tailored to a specific application or end-use by empirical methods.

It should be noted that the sleep circuitry 10 could be modified. Specifically, the diode voltage sensor portion can be modified to detect voltage drops across other components (which are in series with a load) such as a resistor. Proper circuit adaptation and component selection will yield substantially similar performance as that of the illustrated example.

Figure 6:
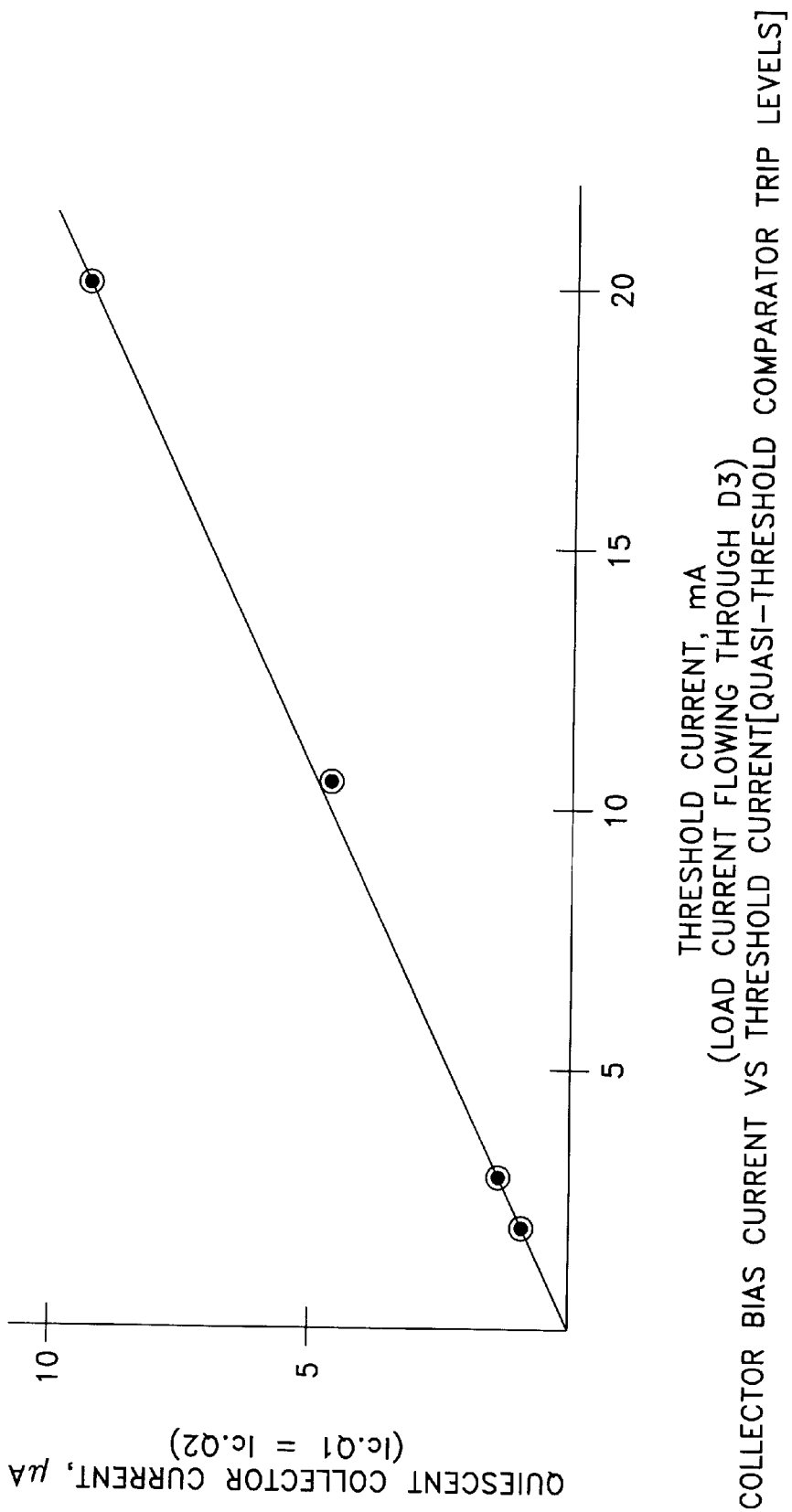
FIG. 6 is a graph illustrating the relationship between the collector current and the threshold current flowing through diode D3.
Figure 7:
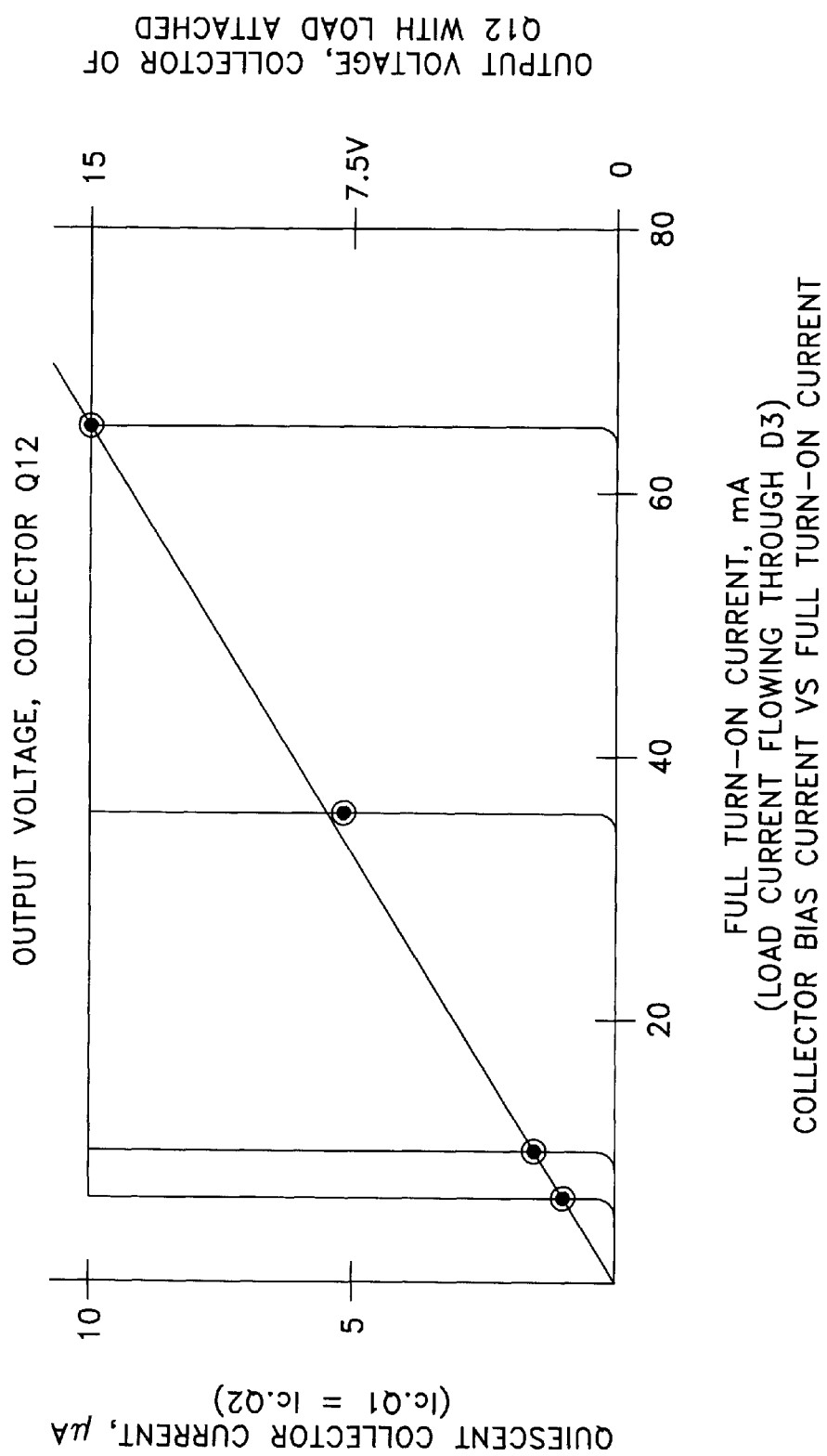
FIG. 7 is a graph illustrating the relationship between the collector current and the turn on current flowing through diode D3.
Figure 8:
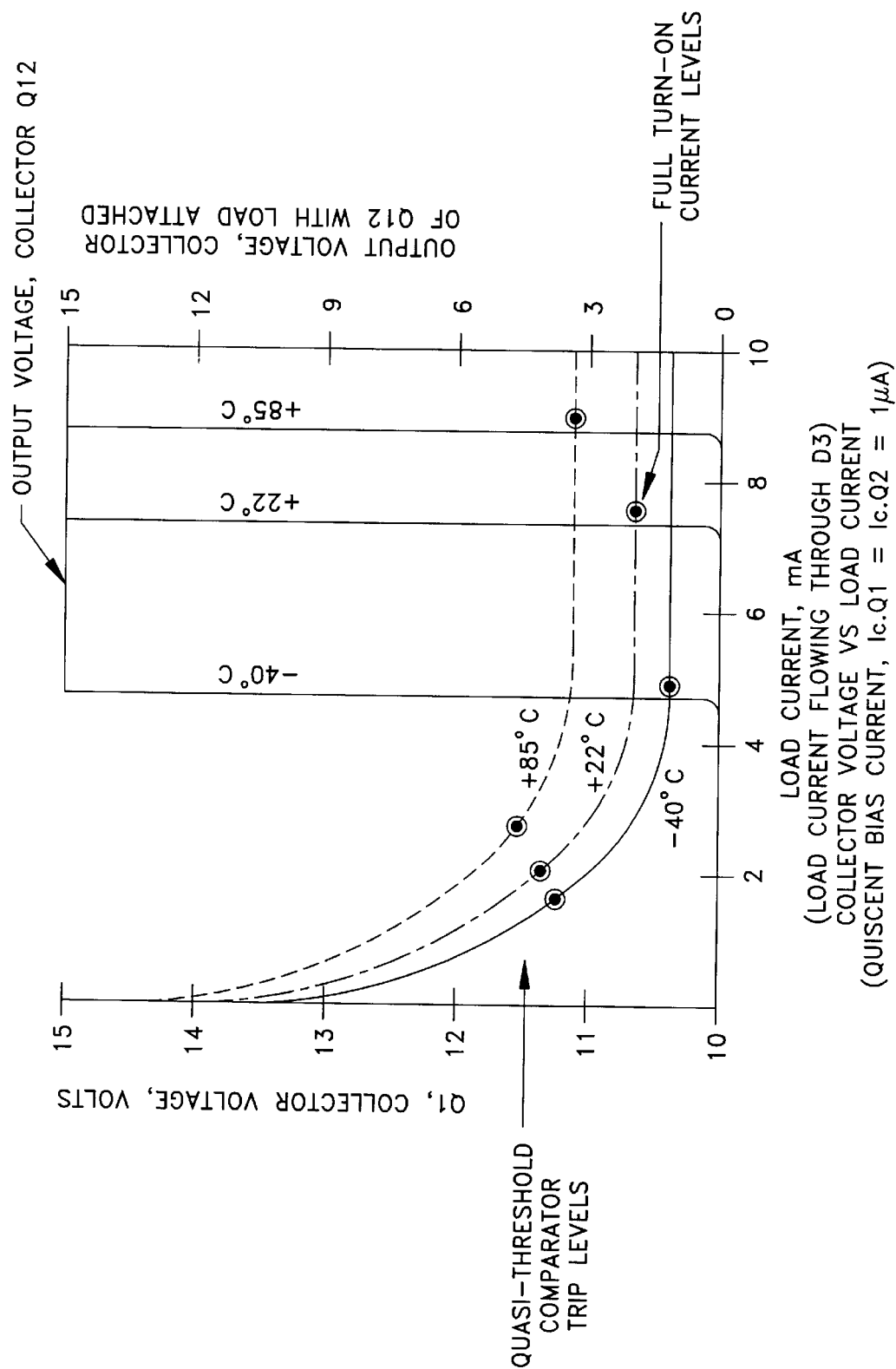
FIG. 8 is a graph illustrating the relationship between the collector voltage and the load current flowing through diode D3 over various temperature ranges.

Performance curves for the component values listed in FIGS. 3–5 regarding sleep circuitry 10 are seen in FIGS. 6–8. These curves exemplify nearly equal or symmetrical quiescent bias and switching currents take into account the loading by and dynamic switching response of quasi-threshold comparator 21 and unless otherwise indicated, are for operation at room ambient temperature.

FIG. 6 is entitled Collector Bias Current vs. Threshold Current [Quasi-threshold Comparator Trip levels]. FIG. 6 illustrates the relationship between the collector bias current of transistors Q1 and Q2 and the load current flowing through diode D3 required to cause a decrease in the collector voltage of transistor Q2 to the initial threshold level of the quasi-threshold comparator circuit 21. Even though transistors Q1 and Q2 are operated well into the non-linear operating regions, a linear relationship between their bias current and the load current (threshold current) is achieved.

FIG. 7 (Collector Bias Current vs. Full Turn-On Current) indicates the relationship between the collector bias current of transistors Q1 and Q2, and the load current flowing through diode D3 required to initiate a full turn-on (or power-on) at the output of the inverter/load driver 31. The relationship between the output voltage response at the collector of PNP transistor Q12 and the full "ON" (output of inverter/load driver 31) current levels is also shown. For a given quiescent collector current level, the difference between the load current required to reach an initial threshold current level and the current required to cause a full turn-on at the output of the sleep circuitry 10 is related to a semiconductor device operating parameters of the transistors and diodes which form part of the diode voltage sensor 11 (Q1, Q2, D1, D3) and part of the quasi-threshold comparator 21 (D4, Q11). When the initial threshold is reached, a small amount of emitter current begins to flow through PNP transistor Q11. This current also flows through Zener diode D4 thereby increasing a voltage drop across D4. These events continue until the voltage level at the base of transistor Q11 has reached (or, decreased to) a level allowing for a stable Zener voltage and base-emitter "ON" voltage ($V_{BE\ Q11\ ON}$) for transistor Q11. Further, from the point of the initial threshold current (load current through D3) to the point of full turn-on current (load current through D3) the amount of emitter current and resulting collector current flow through transistor Q11 is very small, and not sufficient to allow a turn on of the inverter/load driver circuit means 31.

FIG. 8 (Collector Voltage vs. Load Current With Respect to Operating Temperature) indicates performance over an operating temperature of −40 to +85 degrees Celsius for one microampere quiescent bias (collector) current flow through transistors Q1 and Q2 of diode voltage sensor 11. Over this temperature range, as indicated in FIG. 8, the initial threshold voltages of the combined diode voltage sensor 11 and quasi-threshold comparator circuit 21 function/operation are closely spaced but increase in deviation at the full turn-on point. This effect is caused in part by the temperature dependency of the quasi-threshold comparator circuit 21. Further, it is compounded by similar effects (over temperature) that occur from the mismatch in internal diode junction area of diodes D1 and D3.

Power-discharge sensing circuitry 40 is electrically coupled to sleep circuitry 10 and battery 30. Power discharge sensing circuitry is adapted to accurately monitor and provide an output that corresponds to the power discharge rate of the battery. This output is visually displayed to the user, and allows the user to monitor the battery's remaining power due to changes in temperature and varying rates of discharge. Power-discharge sensing circuitry is designed to operate based on a fixed count value. Thus, the amount of discharged battery capacity in each output pulse of power-discharge sensing circuitry 40 is equal to the total battery capacity loss in coulombs divided by the fixed count value, the result expressed in units of coulombs per count. Different batteries have different capacity, therefore, each battery has its own corresponding coulombs per count value. Due to the adjustable feature of the present invention, however, only a single circuit configuration is required which can be adjusted to operate with a wide variety of battery types.

As those of skill in the art will realize, power-discharge sensing circuitry can be used in any application which requires measurement of the amount of power consumed by a load on a battery system.

Sensing resistor 41 is electrically connected in series between the negative terminal of battery system 30 and a terminal point B to which a load is attached. The nominal value(s) of sensing resistor 41 are selected in the range of 0.05 ohms to 0.10 ohms in order to minimize the voltage drop across sensing resistor 41 under high current load conditions. The resistor 41 is in series with the load and any voltage drop across sensing resistor 41 will reduce the effective voltage seen by the external battery load. The current flowing through sensing resistor 41 when a load is placed on the battery is nearly the same current that flows through the load. The current flowing through sensing resistor 41 exceeds the load current by the addition of the entire state of charge operating current.

Figure 9:
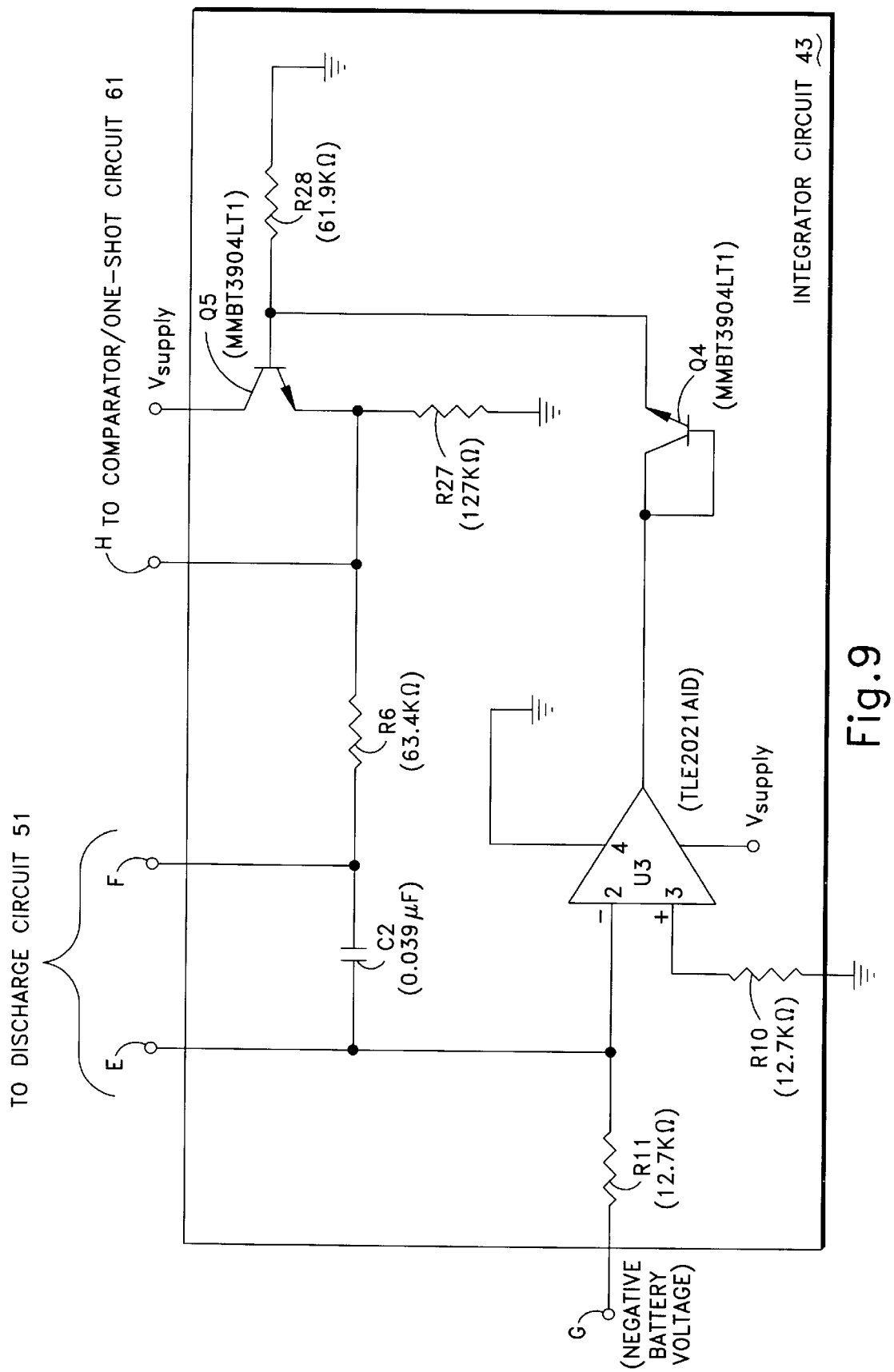
FIG. 9 illustrates the integrator circuit in the power-discharge sensing circuitry of the present invention.

As seen in FIG. 9, integrator circuit 43 includes operational amplifier U3, resistor R11, integration capacitor C2 all in electrical connection with sensing resistor 41. When a load does not exist on battery system 30, integrator circuit 43 is not activated due to the lack of current flow through resistor R11. Further, power (i.e., $V_{SUPPLY}$) is not provided from sleep circuitry 10. When a load is applied to battery 30, the current flowing through sensing resistor 41 induces a voltage across sensing resistor 41 which is proportional to the current flowing through the load. This voltage drop is applied across resistor R11 to the inverting input of operational amplifier U3. Because the non-inverting input of operational amplifier U3 is referenced to ground, and operational amplifier U3 will attempt to maintain the same voltage potential at both the inverting and non-inverting inputs, the voltage output of amplifier U3 (and, in turn, an operational amplifier compensation network, if employed) increases at a linear rate to produce a current flow through resistor R11 which is both proportional to the current flowing through the load and maintains the same voltage potential at both inputs. The current flowing through R11 is used to charge integration (storage) capacitor C2. As those skilled in the art realize, resistor R10 is employed to balance the DC resistance as seen by the inverting and non-inverting inputs of operational amplifier U3. Balanced resistance values are used to minimize any voltage errors resulting from operational amplifier U3 input bias currents.

Because the load current induced voltage drop across sense resistor 41 is relatively small, and because the non-inverting input of operation amplifier U3 is referenced to ground, operational amplifier U3 is required to have a minimal input offset voltage ($V_{IO} \leq 500$ micro-volts) and a common mode input voltage range that encompasses or extends slightly below ground, respectively. The threshold voltage for comparator/one-shot circuit 61 is referenced to ground, therefore operation amplifier U3 is ideally selected to have an output voltage that encompasses ground. If the output of the selected operational amplifier does not encompass ground, the additional of a compensation network is required.

Integrator circuit 43 also includes NPN transistors Q4 and Q5, along with resistors R27 and R28, all of which form a network which compensates for the inability of operational amplifier U3's output to reach ground (e.g., 0 volts). In particular, NPN transistor Q5 is configured as a voltage follower with NPN transistor Q4 configured as a diode. The input to the network is the base-collector junction of transistor Q4, with the network output being the emitter of transistor Q5. The minimum input turn-on voltage for this network is the sum of the base-emitter voltage drops of transistor Q4 and Q5. Once this network is turned "ON", the base-emitter voltage output of transistor Q5 falls below the voltage output of operational amplifier U3 by two base-emitter voltage drops from transistors Q4 and Q5. When the output of operational amplifier U3 reaches the compensation network minimum input turn-on voltage, the output of operational amplifier U3 and, in turn, the output of the compensation network increase at a linear rate which allows current to flow to capacitor C2. The very nature of operational amplifier design will cause the amplifier to adjust its voltage drops for transistors Q4 and Q5, i.e., as $V_{BE}$ changes, operational amplifier changes and output of compensation network is stable. Thus, this network hosts a variety of pin-for-pin compatible operational amplifiers with outputs that do not encompass ground, and will work equally well with pin-for-pin compatible operational amplifiers with outputs that do encompass ground.

Integrator circuit 43 also includes a rate of discharge compensation resistor R6. Resistor R6 allows integrator circuit 43 to provide compensation for the reductions in battery efficiency (from battery manufacturer's data) due to changes in rate of discharge. As the battery load current increases, battery efficiency decreases. The voltage across resistor R6 varies as a function of the battery discharge rate (load current). Since resistor R6 is in series with capacitor C2, the charge current for capacitor C2 also flows through resistor R6 and produces a voltage drop in resistor R6. This voltage drop (which is proportional to load current), added to the voltage drop across capacitor C2 and referenced to a fixed comparator voltage threshold, reduces both the voltage level to which capacitor C2 is charged and the charge cycle frequency. Therefore, the reduction in the charge cycle time period increases the rate at which the cycle is repeated and is proportional to the reduction in battery efficiency.

Figure 10:
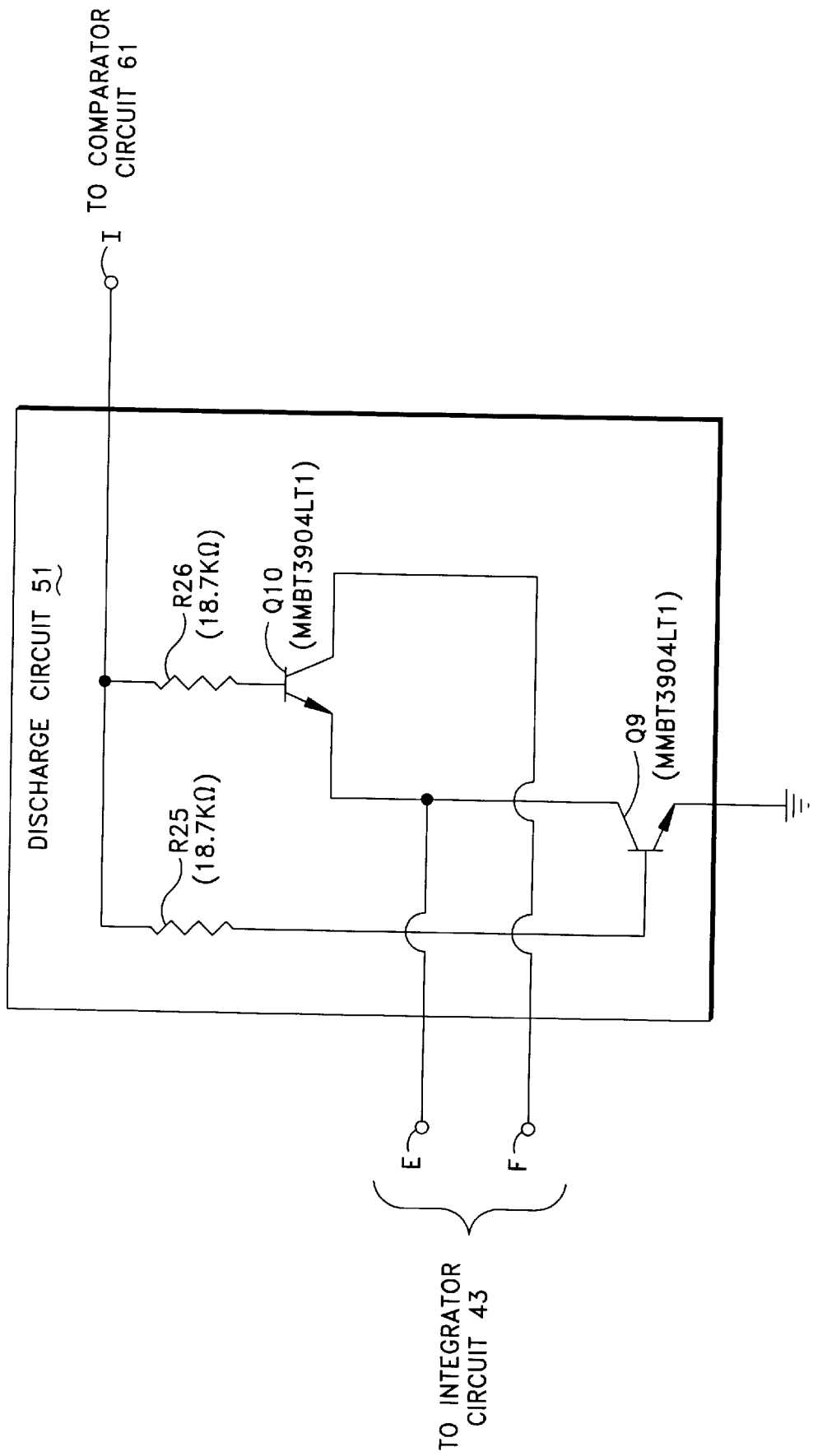
FIG. 10 illustrates the discharge circuit in the power-discharge sensing circuitry of the present invention.

As seen in FIG. 10, discharge circuit 51 includes NPN transistors Q9 and Q10 and current limiting resistors R25 and R26. When a pulse is sent from comparator/one shot circuit 61 (as discussed below), the pulse is applied to NPN transistors Q9 and Q10 through current limiting resistors R25 and R26. This event causes discharge transistor Q10 and current shunting transistor Q9 to simultaneously turn on, and storage capacitor C2 (as seen in FIG. 9) is discharged through transistor Q10.

Transistor Q9 provides a low resistance path to ground to shunt the resulting base-emitter current (during discharge) of transistor Q10. This action prevents unwanted voltage increases at the inverting input of operational amplifier U3. After the pulse is sent, the output of the comparator/one shot circuit 61 is again low, allowing the integration/charge/discharge cycle to repeat.

Comparator/one-shot circuit 61 (FIG. 11) includes operational amplifier U1, feedback capacitor C1, discharge resistor R5 and further includes a voltage threshold/temperature compensation and calibration network which is comprised of Zener diode D5, resistors R7, R15, R31, R35, R40, R41, and R44 and thermistor RT1. The input to comparator/one-shot circuit (through resistor R5 from integrator circuit 43) is applied at the non-inverting terminal of the operational amplifier U1. The threshold reference voltage is applied at the inverting input of the operational amplifier U1. When the sum of the voltage across capacitor C2 and the rate of discharge compensation resistor R6 reaches a predetermined voltage threshold level, this event triggers a low to high transition at the output of operational amplifier U1 and thus, effectively activates comparator/one-shot circuit 61. As those skilled in the art know, feedback capacitor C1 and input resistor R5 are used to adjust the discharge pulse "ON" time, and resistors R1 and R2 are employed as a bias current network according to the device manufacturer's data book.

Figure 11:
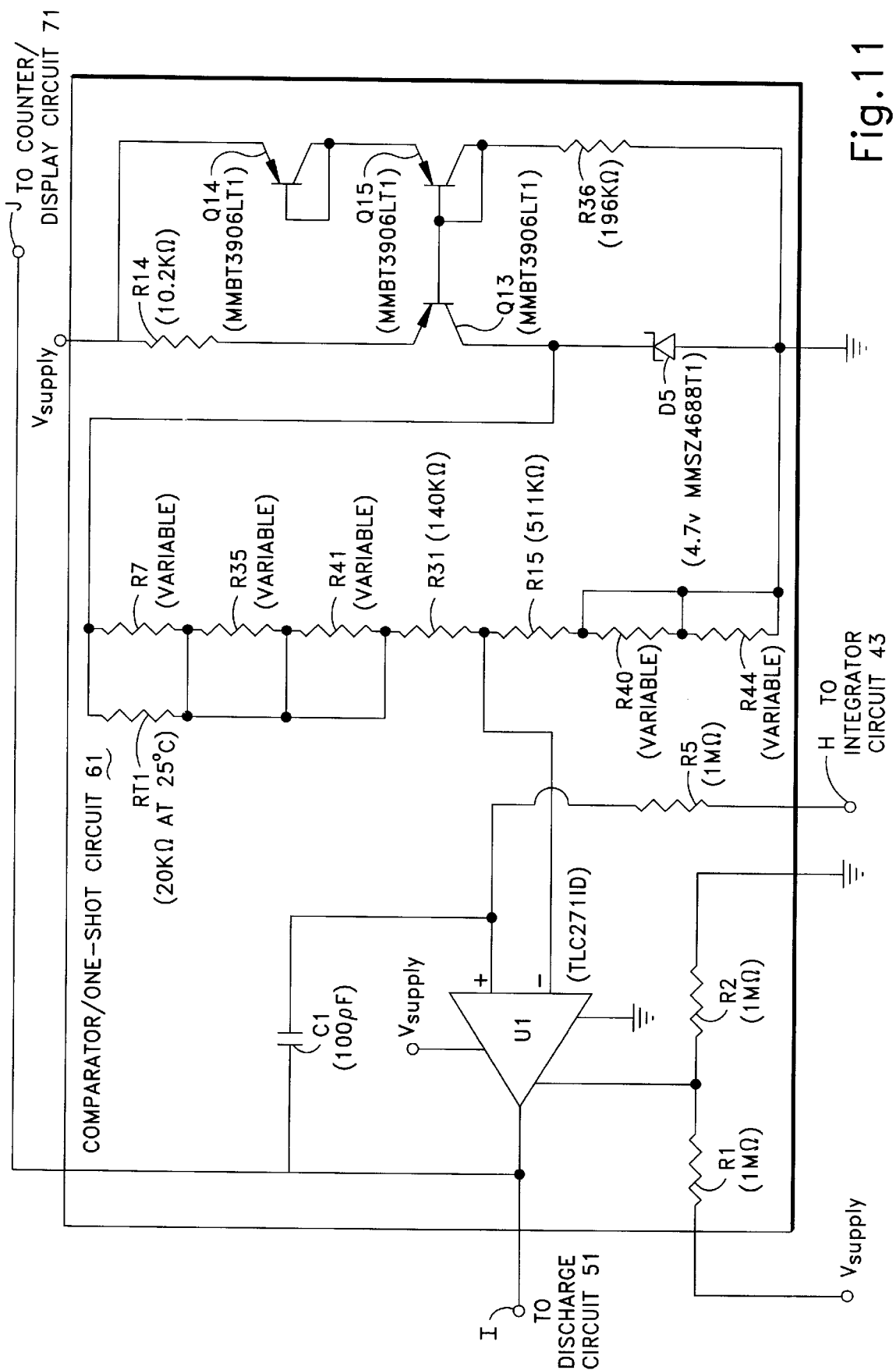
FIG. 11 illustrates the comparator/one-shot circuit in the power-discharge sensing circuitry of the present invention.

The voltage threshold/temperature compensation and calibration network shown in FIG. 11 (D5, R7, R15, R31, R35, R40, R41, R44 and RT1) produces a reference threshold voltage (at the junction of R31 and R15) which provides the desired rate of change (varying reference threshold voltage) over temperature. In operation, a constant current source from PNP transistors Q13, Q14 and Q15 and resistors R14 and R36 is applied to provide relatively constant current (over varying temperature and supply voltages) to zener diode D5 and the threshold/temperature compensation and calibration network.

By establishing (at room ambient temperature) a voltage threshold/temperature compensation and calibration network current which is at least one order of magnitude smaller than the zener diode regulating current, the change in voltage threshold/temperature compensation and calibration network current, which is a function of temperature (RT1 varies with temperature) has very little impact on the zener diode D5 regulating current.

Transistor Q14 is configured as a diode to provide a single $V_{BE}$ reference voltage drop, which is relatively insensitive to variations in current through Q14, and to variations in temperature. The collector current of transistor Q13 is used as the constant current for zener diode D5 and the voltage threshold/temperature compensation and calibration network. Transistor Q15 is used to provide circuit bias stability over temperature. By establishing equal bias network and voltage threshold/temperature compensation and calibration network currents, like NPN transistors Q13 and Q15 yield very similar operating characteristics over temperature and improve over-all circuit stability. Resistor R14 establishes the desired zener diode and voltage threshold/temperature compensation and calibration network current, with resistor R36 being used to establish the desired bias network current.

The use of thermistor RT1 in the voltage threshold/temperature compensation and calibration network provides an increase in resistance for a reduction in temperature. Since thermistor RT1 comprises part of an over-all voltage divider network, the resulting increase in resistance (as temperature decreases) results in a reference threshold voltage which also decreases with temperature. Resistor R7, in parallel with thermistor RT1, and in series with R31 resistor are used to adjust the rate of change of the resistance as a function of temperature. By adjusting the network voltage divider resistance ratios and rate of resistance change over temperature, a desired overall temperature comparison profile can be established. The resulting decrease in threshold reference voltage (as a temperature decreases) results in a decrease in the voltage to capacitor C2. This decreases the integration (or charge) frequency, which in-turn increases the count rate frequency, thus compensating for reductions in battery efficiency due to reductions in temperature.

The nominal threshold voltage (as well as the desired temperature compensation profile) which is applied to the inverting input of operational amplifier U1 is determined by the use of the over-all voltage divider network resistors R7, R15 and R31, and thermistor RT1. Variations in device parameters and component tolerances can cause unacceptable degradation in measurement accuracy. In order to eliminate the need for high-cost precision components and further reduce cost, this voltage divider network also serves as a single calibration point. With resistors R7, R15 and R31 and thermistor RT1 being set at a fixed value (at +21° C.), and based upon the result of the single time base measurement (taken at +21° C.), the appropriate value(s) of calibration resistors R35, R40, R41 and/or R44 can be introduced for each unit during calibration by cutting/breaking the traces (shorts) which are initially in parallel with each of the calibration resistors, thus adjusting the comparator threshold voltage. Calibration can also be accomplished by a single point/single resistor method. An example of such a time base measurement method is done with a known resistor temporarily in place of $R_{CAL}$ (strategic resistor in network R15 or R31) and with proper $R_{CAL}$ inserted, based on measurement. This circuit 61 can be realized in a no-calibration-required configuration by utilizing error analysis/statistical methods during design with reasonably good performance and accuracy attainable. This change in threshold voltage either increases or decreases the charge cycle time period of capacitor C2 to that desired for the given battery of interest and calibration rate of discharge.

Figure 12:
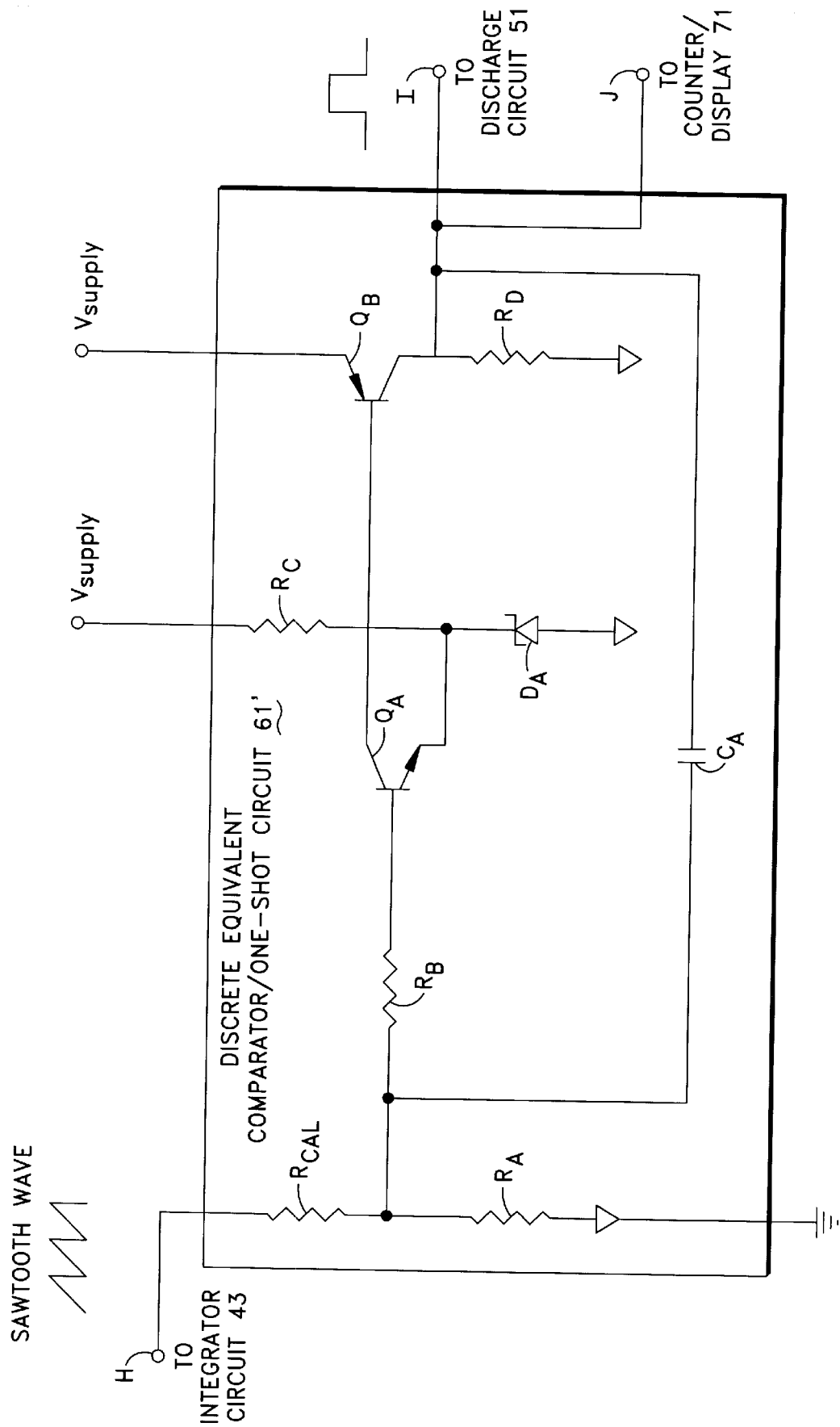
FIG. 12 illustrates an alternate means (e.g., discrete components) for providing a comparator/one-shot circuit in the power-discharge sensing circuitry of the present invention.

Those skilled in the art will know that the comparator/one-shot circuit 61 can be replaced with equivalent discrete components that provide the same transition from a sawtooth waveform to a discharge pulse such as seen in the comparator/one-shot circuit 61', of FIG. 12. NPN input transistor $Q_A$, PNP output transistor $Q_B$, zener diode $D_A$, bias resistors $R_C$ and $R_D$, input resistor $R_B$, and feedback capacitor CA form the discrete component equivalent of a voltage threshold comparator/one-shot multi-vibrator circuit. The input to this circuit 61'(through input resistor $R_B$) is taken from the output of the voltage divider network formed by resistors $R_{CAL}$ and $R_A$. This network serves as the output threshold and calibration network and is feed through resistor $R_{CAL}$ from the output of the integrator circuit. When the voltage across integration (storage) capacitor $C_2$ and the temperature/rate of discharge network reaches a set voltage level, it triggers the voltage threshold/one-shot multi-vibrator circuit. As with the op-amp realization of this circuit, the output of the discrete component realization is a positive going pulse of fixed duration. This pulse is used to activate the storage capacitor $C_2$ discharge network. This discrete component voltage threshold/one-shot multi-vibrator circuit 61' is realized via standard (readily available), low-cost components, and provides considerable savings when compared to the op-amp version of the same. This circuit provides good accuracy, and micro-power consumption while incorporating standard small signal diodes and bipolar-junction transistors.

The use of positive feed back capacitor CA in conjunction with Thevenin equivalent resistance seen looking into the junction of resistors $R_{CAL}$, $R_A$, and $R_B$ enable this voltage threshold comparator circuit to also function as a one-shot multi-vibrator. The output of the voltage threshold comparator/one-shot multi-vibrator circuit, taken at the collector of PNP transistor $Q_B$ is a positive-going pulse of fixed duration. When the voltage across integration (storage) capacitor $C_2$ and the temperature/rate of discharge compensation network reaches a set voltage threshold level, it triggers a low to high transition at the collector of PNP output transistor $Q_B$.

With capacitor $C_1$ providing positive feedback, this low to high voltage transition (collector of transistor $Q_B$) forces the voltage at the junction of resistors $R_{CAL}$, $R_A$, and $R_B$ to a level one threshold voltage drop above the output voltage. The output at the collector of PNP transistor $Q_B$ remains high for a fixed duration after storage capacitor $C_2$ is discharged. The selected values of the feedback capacitor $C_A$ and resistors $R_{CAL}$, $R_A$, and $R_B$ are used to adjust the duration of the positive-going output pulse.

The nominal input threshold voltage (trigger voltage) is established by the series sum of the zener diode $D_A$ voltage drop and the base-emitter on voltage $V_{BE}$ of NPN input transistor $Q_A$. The zener diode $D_A$ voltage $V_Z$ is selected so that the sum of the series voltage drops $V_{BE}$, $Q_1$ and $V_Z$ is always less than the desired peak voltage at the output of the integrator circuit. The voltage divider network formed by resistors $R_{CAL}$ and $R_A$ is used to scale (divide) the desired peak voltage down to the threshold voltage (trigger voltage) level. This network allows a circuit incorporating one value of zener diode $D_A$ to be tailored for use with a wide range of peak voltage levels. Variations in device parameters and component tolerances can cause unacceptable degradation in measurement accuracy. In order to eliminate the need for precision components and further reduce cost, the voltage divider network $R_{CAL}$ and $R_A$ also serves as a single calibration point.

Desired measurement accuracy is attained by a single point calibration method. This method requires a single time base measurement through a known value reference resistor, used in place of the calibration resistor $R_{CAL}$. This measurement is performed at a specified discharge rate for the given battery of interest. The result of the single time base measurement will fall within one of a fixed number of error windows. The nominal time interval (middle value) for each error window establishes a ratio with the ideal specified discharge rate for a given battery. These ratios are used to predetermine the required value of calibration resistor $R_{CAL}$ value for each of the error windows. With resistor $R_A$ fixed, and based upon the result of the single time base measurement, the appropriate value of calibration resistor $R_{CAL}$ is inserted for each unit during calibration. By adjusting the value of resistor $R_{CAL}$, the ratio of peak voltage to threshold voltage (trigger voltage) is also adjusted. This change in threshold voltage either increases or decreases the charge cycle time period (of capacitor $C_2$) to that desired for the given battery of interest and calibration rate of discharge.

Figure 13:
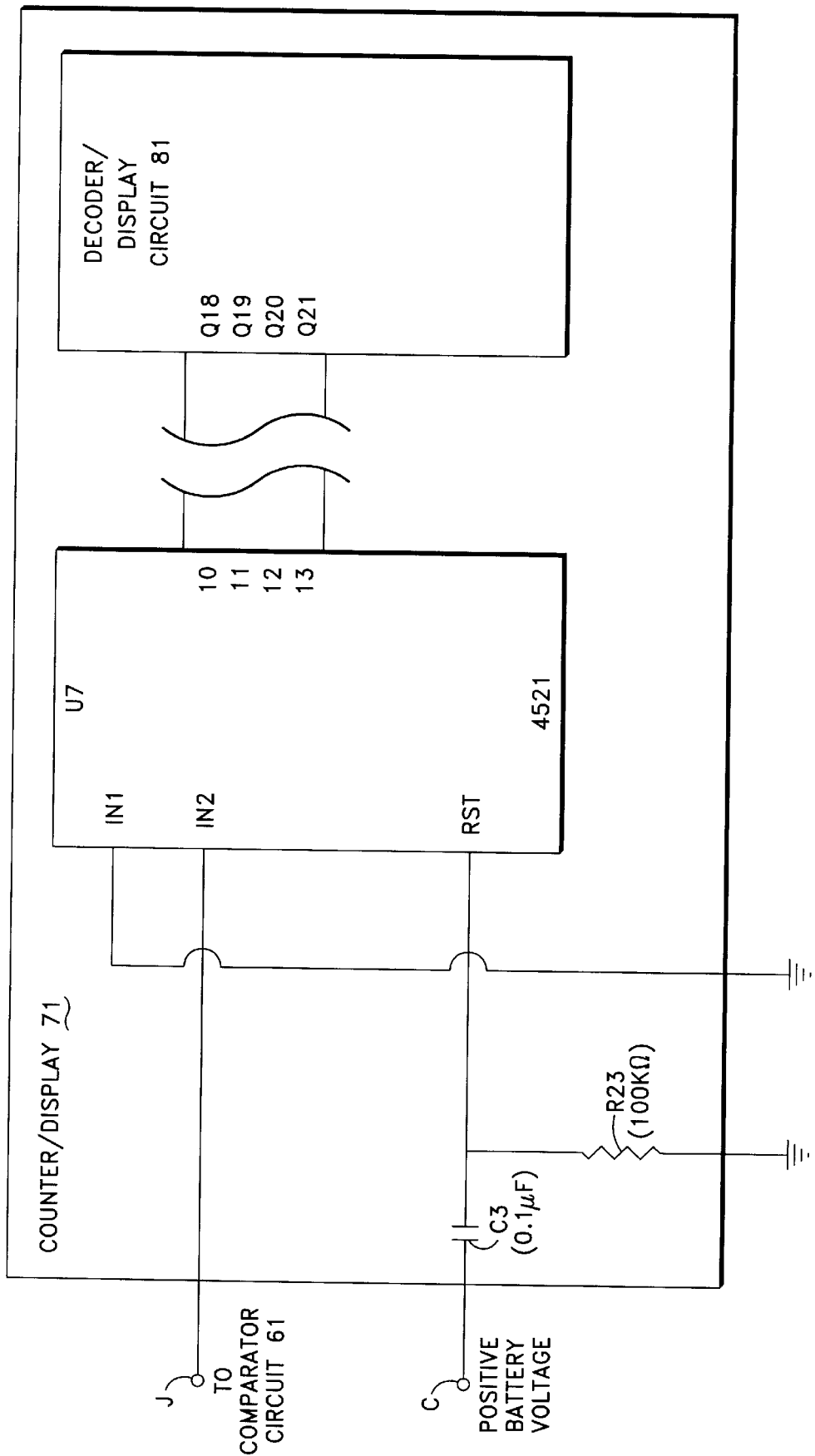
FIG. 13 illustrates the counter circuit in the power-discharge sensing circuitry of the present invention.
Figure 14:
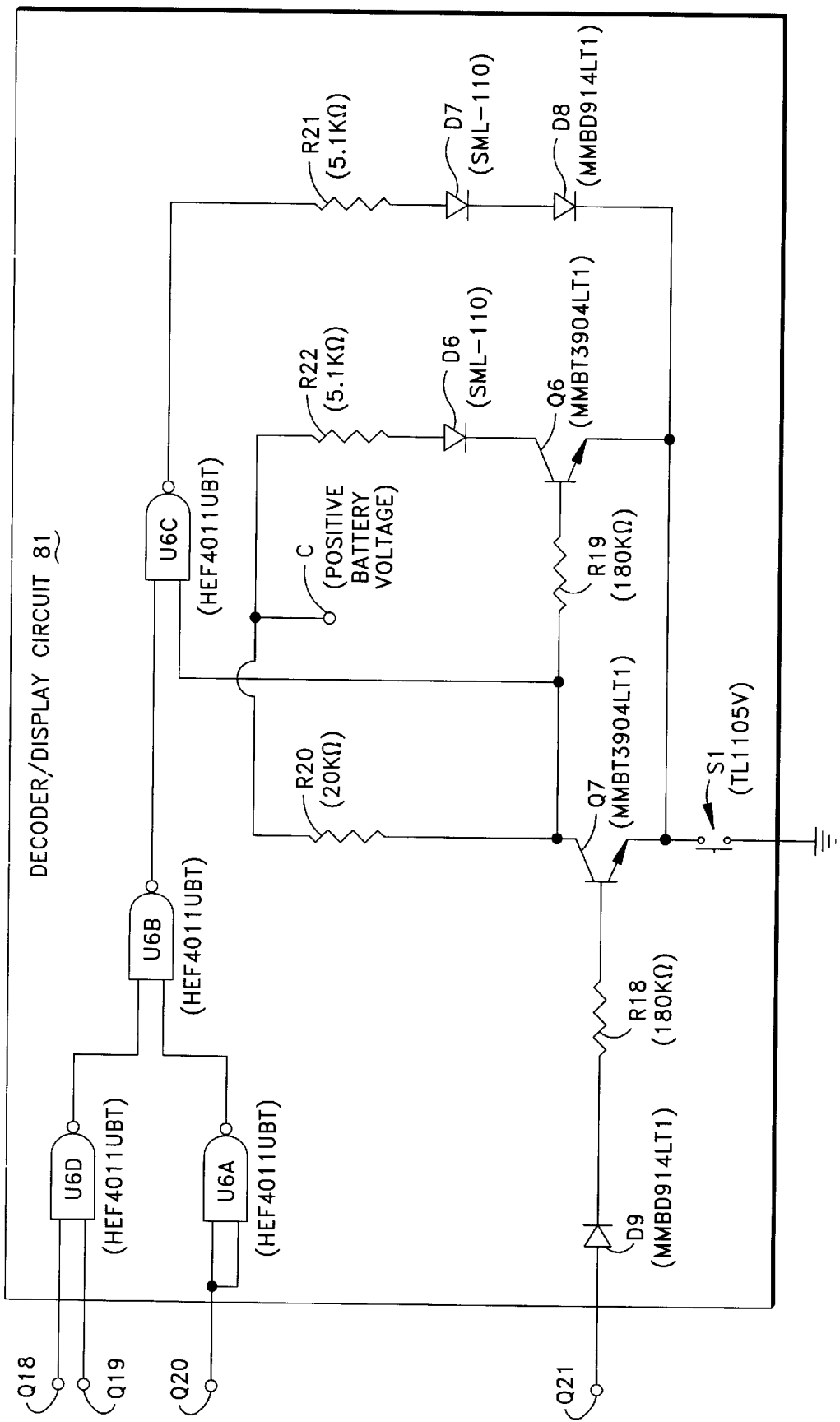
FIG. 14 illustrates the Decoder/Display circuit in the power-discharge sensing circuitry of the present invention.

As seen in FIGS. 13 and 14, counter/display circuit 71 includes a 24 bit binary counter U7 and decoder/display circuit 81. Counter U7 is of conventional design, having a reset RST that is momentarily activated upon connection to battery power circuitry through capacitor C3 and resistor R23. This action establishes a clear counter condition. As seen in FIGS. 13 and 14, certain outputs of counter U7 are electrically connected (Q18, Q19, Q20, Q21) to the input decoder/display circuit 81 via diode D9 and NAND gates U6A and U6D.

The binary operation of counter circuit 71 is detailed in the table of FIG. 15. The 24-bit binary counter U7 provides outputs for the seven most significant bits (Q18 through Q24). Rather than using the full count range of 24 bit counter U7, only 21 bits are necessary ($2^{21}$=2,097,152). Therefore, the outputs are taken at Q18, Q19, Q20 and Q21. To represent the full count value, the maximum count value is set at the binary equivalent of 1,310,720 to achieve a 10% transition division in counter U7 (or, transition "breakpoint"). Maximum count values of 2,621,440; 5,242,880; and 10,985,760 can easily be achieved by properly selecting four successive outputs from the seven most significant bits available. This will alter the maximum count value but will not effect the accuracy of the 10% transition "breakpoints". The 20% and 70% threshold points of the accumulated count occur at count overflow states of Q17 through Q1, thus eliminating any error due to the binary representation of these values. This method also yields both simplified decoder/display logic, and 60% count overflow buffer to prevent an unwanted counter reset upon maximum (established) counter value overflow. Therefore, all empty cells in the graph of FIG. 15 represent don't care states.

Counter circuit 71 includes a four bit binary output from counter U7, which allows the user to set any logic breakpoint at 10% increments of the maximum count value with no modification of the counter circuit, required. These logic breakpoints fall at exact 10% increments of the maximum count value, and therefore introduce no error due to binary count approximation. Logic breakpoints can be selected at 5% increments, again with no modification of the counter circuit required. However, logic breakpoints at the odd multiples (of the 5% increments) will typically exhibit binary count approximation errors in the range of 1% to 3%, and thus are not preferred. Conversely, even multiples of the 5% increments occur at the 10% point, introduce no binary approximation error and are thus preferable.

Decoder/display circuit 81 decodes the binary output states of the counter and provides LED displays for specified battery discharge states. Decoder/display circuit 81 includes a NAND gate package U6 having quadruple NAND gates U6A, U6B, U6C and U6D, and NPN transistor equivalent inverter network (Q7, R18, and R20). Diode D9 is used to prevent reverse bias breakdown of transistor Q7. In order to further reduce overall quiescent current drain, continuous power from the positive battery terminal is supplied only to quad NAND gate U6 with the transistor inverter network being powered only upon actuation of the display switch S1.

The display for decoder/display circuit 81 consists of a pair of light emitting diodes D6 and D7, current limiting resistors R21 and R22, and a momentary switch S1. NPN transistor Q6 is used to buffer the output of transistor inverter network Q7, Q18, and R20 and increase the current drive for light emitting diode D6. Diode D8 is used to prevent reverse bias breakdown in transistor QG and light emitting diode D7. Power is supplied to the display only upon actuation of display switch S1.

With the foregoing discussion of decoder/display circuit 81, the following chart indicates the operation of light emitting diodes D6 and D7:

| D5 | D6 | Battery Power Remaining |
| --- | --- | --- |
| On | On | Greater than 70% |
| On | Off | Between 70% and 20% |
| Off | On | Less than 20% |
| Off | Off | Battery discharged |

Therefore, depending on the state of light emitting diodes D5 and D6, an operator can verify the amount of battery power remaining in a given battery system 30 by depressing switch S1.

Figure 16:
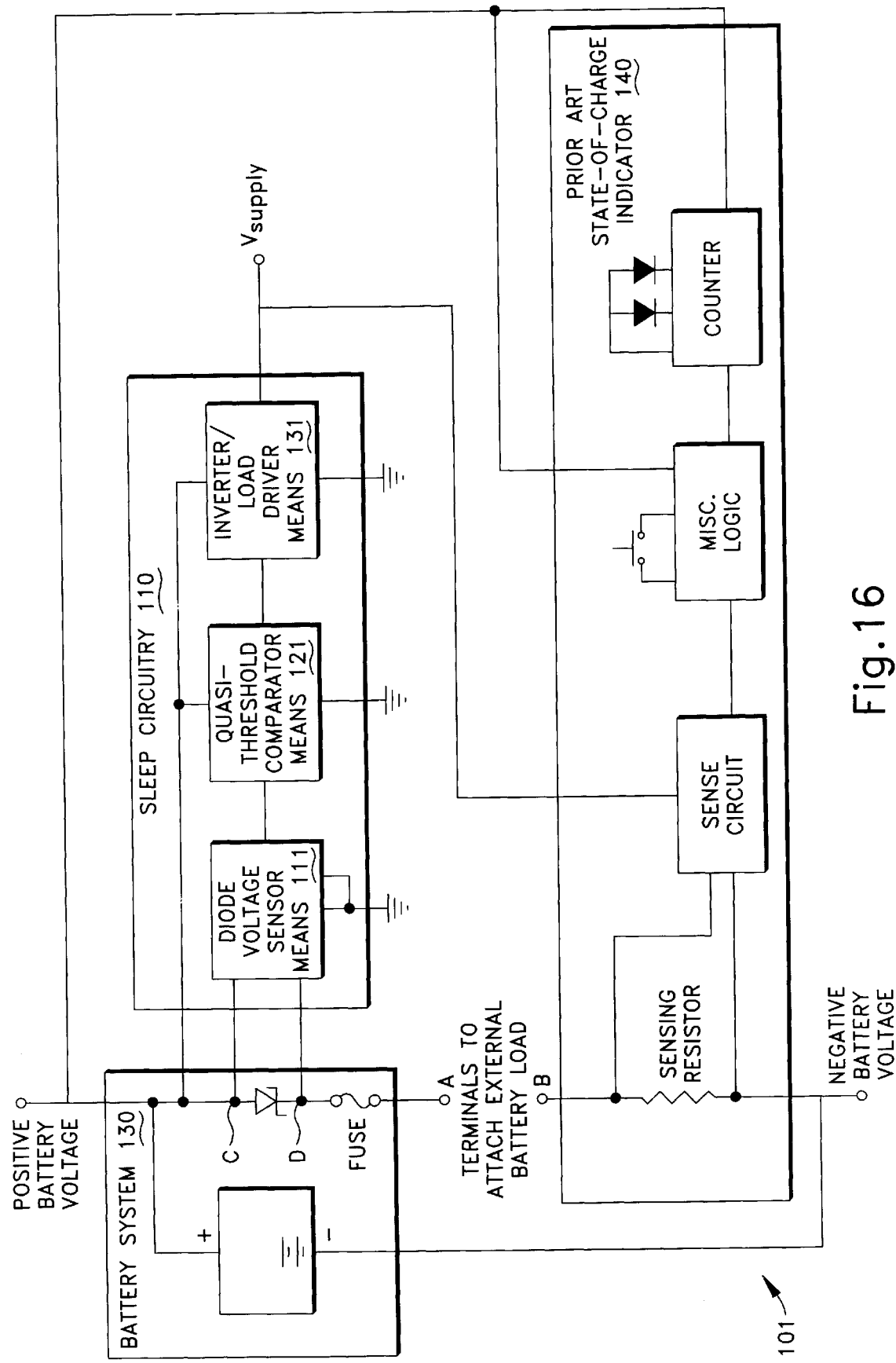
FIG. 16 is a block diagram of an alternate embodiment of the present invention used with known power-discharge sensing circuitry.

FIG. 16 illustrates an alternate embodiment of the present invention. In this embodiment, battery capacity measurement system 101 includes sleep circuitry 110 and battery system 30 in electrical connection with a prior art state-of-charge indicator 140 such as disclosed in Atwater et al. Both battery system 130 and sleep circuitry 110 are equivalent to battery system 30 and sleep circuitry 10 described previously. In this embodiment, the output of sleep circuitry 110 ($V_{SUPPLY}$ from transistor Q12) is electrically connected to the sense circuit of state-of-charge indicator 140. In this fashion, the sense circuit of prior art state-of-charge indicator 140 is placed in an inactive (or, sleep) mode by the output of sleep circuitry 110 when there is no load across terminals A and B (no power is supplied to this circuit). The counter and miscellaneous logic of state-of-charge indicator 140 requires continuous power to maintain a count value and to provide an LED display to the user, therefore, power is continuously applied to the counter and miscellaneous logic. Slight modification to the miscellaneous logic and counter circuit of priority state-of-charge indicator 140, could allow the miscellaneous logic to also be powered by the sleep circuitry 10, thus appreciably reducing overall quiescent current consumption. When a load is placed across terminals A and B. sleep circuitry 110 operates to activate state-of-charge indicator 140, which can then detect the amount of power discharged from battery system 130 and function to keep track of the amount of power dissipated in battery system 130.

The present invention (e.g., sleep circuitry 110/sleep circuitry 10) contemplates use as a low-side detection device by merely replacing the PNP transistors with their NPN counterparts, relocating existing protection diode D3 and inverting the required portions of the circuit to allow for low-side detection. In this situation, the user must reference sleep circuitry 110/sleep circuitry 10 operation to ground rather than the positive battery voltage. While the reference point changes, the design and methodology, as disclosed, does not. Those skilled in the art could also invert/modify the remaining state-of-charge indicator circuitry (using the proper components) and perform high-side power discharge sensing/monitoring.

Those skilled in the art will know that by changing the doping process of particular semiconductor devices (through both the implantation process and the introduction of certain impurities) when such devices are fabricated, the performance characteristics of these devices can be altered. Therefore, the present invention (i.e., sleep circuitry 110/sleep circuitry 10) can be used in custom semiconductors, application specific semiconductors, other electrical components or any combination of these devices to optimize its performance or physical characteristics. Thus, by way of example and not by means of limitation, the present invention can be incorporated into a specialized semiconductor device which requires only the selection of one or more resistor values to provide the desired operating conditions. The result being a widely applicable, enhanced performance, and specialized sleep circuit.

The present invention (i.e., sleep circuitry 110/sleep circuitry 10) can be used in any application requiring power conservation from a power source. Further, the present invention in whole or in part (namely, the diode voltage sensor means) can be applied to many end-use applications which require the detection of very low levels of current which are induced across a diode when a load is placed on the end-use application.

The comparator circuit according to the present invention provides a unique configuration with definite advantages over standard implementations for this type of circuit, and incorporates several novel features. Specifically, standard/conventional implementations of integrator/coulometer circuits make use of more costly MOSFET devices, particularly in the discharge network. The circuit of the present invention uses standard/common, readily available, and lower cost small signal bipolar-junction transistors in place of these MOSFET devices. This circuit maintains the same micro-power consumption (while employing bipolar-junction technology) as the more conventional versions (versions employing MOSFET technology). Desired measurement accuracy is attained by a single point calibration method requiring only a single time base measurement in order to eliminate the need for precision components and further reduce cost. This method allows for circuit realization via standard/common, readily available, and low-cost components while yielding the accuracy of more costly/complex conventional coulometer implementations. The methods employed via the circuit yields accuracy normally achieved via more complex/costly implementations of the same. The circuit of the present invention can be adapted to cover a wide range of battery voltages and capacities. The values of the integration (storage) capacitor, current setting resistor, and comparator threshold voltage are adjusted to match the voltage and capacity for any given battery of interest. The incorporation of a temperature and rate of discharge compensation network also allows this circuit to be tailored to compensate for reductions in battery efficiency due to changes in temperature and rate of discharge. The circuit of the present invention is micro-power while in operation (consuming only a few hundred micro-amperes), is reliable, and maintains accuracy over the operating temperature range of −40 to +85° C. The circuit of the present invention can be used in any application that may require measurement of the amount of electrical energy consumed by a load and/or removed from the source (reduction in capacity).

Further, the power-on/sleep circuit according to the present invention, overall, is a novel/innovative configuration providing a reliable, low-cost, and micro-power alternative/replacement to more costly monolithic devices and/or complex circuit configurations. This power-on/sleep circuit provides the ability to control the power applied to other control/monitoring/indicator circuits when the equipment item is in use (power-on) and to limit those control/monitoring/indicator circuits when the primary equipment is not in use (sleep). This circuit can be used to replace more costly monolithic comparators for given applications. The power-on/sleep circuit can be configured as either a high-side (positive voltage potential) or low-side detector (negative voltage potential or ground), thus functioning as a comparator with a full rail-to-rail common mode input voltage range. Most electrical/electronic equipment/systems that either consume energy and/or source energy incorporate protection elements (protection diodes) in series between source and load. The power-on/sleep circuit of the present invention makes use of the small current induced voltage drop across a diode, thus making use of an existing component (no sense element needs to be added). If no series diode/protection diode is present, one can usually be added, with minimal impact (minimal series voltage drop), allowing the power-on/sleep circuit mode circuit to be incorporated. The power-on/sleep circuit of the present invention is realized with a minimal number of standard/common, readily available, and low-cost small signal transistors (bipolar-junction transistors) and diodes. This circuit yields true micro-power operation, requiring only a few unit micro-amperes of quiescent current (sleep), and only a few tens of microamperes of current while supplying load current (power-on). This circuit is very tolerant to changes in battery cell string voltages. Good circuit stability/performance is provided over the operation temperature range of −40 to +85° C. Proper selection of components will extend this operating temperature range from −55 to +125° C. The diode voltage drop detection sensitivity range of this circuit can be adjusted over a wide range of threshold currents ranging from a few hundred microamperes to many amperes. The output (load driver) stage of this circuit can be adapted to provide the control of power to both small (low current) and large (high current) loads. By changing the doping process (types of impurities/levels of implantation), the performance characteristics of semiconductor devices can be altered. This provides one variant to/improvement upon the standard (readily available) small signal bipolar-junction transistor technology employed in the power-on/sleep circuit, the incorporation of custom semiconductor devices which are optimized to allow one circuit configuration to be easily tailored (selection of a minimal number of component values) to a very wide range of applications. The power-on/sleep circuit can be assembled on/or incorporated into a single chip requiring only the selection of one or several external resistor values to provide desired operation. This invention/concept can be used in any application requiring (battery or any other type) electrical power/energy conservation and/or management until load power (electric) is required to operate primary (or other) equipment. This circuit in its entirety or in part (diode voltage drop detection amplifier) can be applied to many applications requiring the detection of (and some resulting application to) a small current induced voltage drop across an existing (in series with a load) diode/element.

Whereas the drawings and accompanying description have shown and described the preferred embodiment of the present invention, it should be apparent to those skilled in the art that various changes may be made in the form of the invention without affecting the scope thereof. For example, the sleep circuit as described above can be modified/enhanced to yield very controlled/accurate performance over its intended operating temperature range. The circuit topology will increase in complexity/component count proportional to the type of modifications/enhancements incorporated. The quiescent current consumption, threshold sensitivity, operating voltage range, and performance over temperature of the diode voltage drop detection amplifier stage can be enhanced/modified by the incorporation of current/voltage feedback techniques and/or constant current sources/active loads. All of these modifications/enhancements can be realized via standard (readily available) small signal bipolar-junction transistors and/or diodes. The threshold sensitivity range and the speed/accuracy of the overall switching response (over temperature) can be improved by modifying the quasi-threshold comparator stage. One approach is to use MOS-FET devices for realization of this stage or to replace this stage completely with a monolithic comparator (monolithic device). The output current drive capabilities (output of the power-on/sleep circuit) can be modified to drive large currents by replacing the output drive transistor (Q12) with a device such as an isolated-gate bipolar-junction transistor or power MOSFET. Also, the circuit can easily be re-configured to function as a low-side detection device by simply replacing the PNP transistors with their NPN complements and referencing circuit operation to ground rather than the most positive voltage potential. The reference point changes, the design/analysis methodology does not. Further, operation in the temperature range of −55 to +125° C. can be achieved via selection of the proper grade of components, primarily the diodes and small signal bipolar-junction transistors. Again, components designed to operate over this extended temperature range are low-cost and readily available.

We claim:

1. An electronic circuit and battery system for reducing the need to continuously monitor the amount of power remaining in a power source, the system comprising:
   (a) a battery system;
   (b) a sleep circuit in electrical connection with the battery system, the sleep circuit including substantially similar transistors, and a bias diode which is selected to have a substantially similar temperature co-efficient as that of a protection diode within the system, in electrical connection with substantially similar resistors to obtain circuit stability and temperature tracking over a wide range of temperatures and voltages from the battery system; and (c) a power-discharge sensing circuit electrically coupled to the sleep circuit and battery system, the sleep circuit controlling the power-discharge sensing circuit to monitor the power remaining in the battery system.

2. The electronic circuit and battery system of claim 1, wherein the sleep circuit includes a diode voltage sensor electrically coupled to the battery system, a quasi-threshold comparator circuit electrically coupled to the diode voltage sensor, and an inverter/load driver circuit electrically coupled to the quasi-threshold comparator circuit and the power-discharge sensing circuit.

3. The electronic circuit and battery system of claim 1, wherein the power-discharge sensing circuit includes a sensing resistor, an integrator circuit, a discharge circuit, a comparator/one-shot circuit and a counter/display unit, all in electrical communication with each other.

4. A battery capacity measurement system adapted to operate over a wide range of temperatures and battery voltages, comprising:

(a) a battery system having at least one battery cell in electrical connection with a protection diode and a fuse;

(b) a power-discharge sensing circuit in electrical communication with the battery system; and (c) a sleep circuit attached to the battery system, the sleep circuit electrically monitoring the battery system to control the power-discharge sensing circuit to reduce the amount of power consumed by the power-discharge sensing circuit regardless of the existence of a load on the battery system.

5. A micro-power sleep circuit in electrical connection with a battery system and a power-discharge sensing circuit, the sleep circuit adapted to monitor voltage changes across existing protection diode of the battery system to control the power-discharge sensing circuit and thereby significantly diminish the amount of power required to operate the power-discharge sensing circuit.

6. A device for monitoring the amount of power remaining in a power source, including a battery system having at least one battery in electrical connection with a protection diode and a fuse, the improvement comprising:

(a) a micro-power sleep circuit electrically monitoring the battery system; and (b) a power-discharge sensing circuit in electrical contact with the battery system and the sleep circuit, the power-discharge circuit controlled by the sleep circuit whenever the sleep circuit detects a voltage change in the battery system.

7. A device for monitoring the amount of power remaining in a power source, including a battery system electrically attached to a continuously powered state-of-charge indicator, the improvement comprising a micro-power sleep circuit electrically attached to the battery system and electrically controlling operation of the state-of-charge indicator, the sleep circuit designed to monitor voltage changes across an existing protection diode of the battery system to significantly reduce the need to continuously monitor the amount of power remaining in the power source.

8. A device for monitoring an amount of electric power in a power source, said apparatus comprising:

means for measuring power provided by the power source;

means for counting units of the measured power;

means for detecting whether an external power-consuming load is connected to the power source; and means for supplying operating power to said means for measuring only when said means for detecting detects the power-consuming load.

9. A device as set forth in claim 8, wherein said means for measuring includes an integrator circuit.

10. A device as set forth in claim 8, wherein the power source has a diode, and said means for detecting includes a diode voltage sensor for sensing voltage across the diode.

11. A device as set forth in claim 8, wherein said means for detecting includes a comparator circuit, said diode voltage sensor includes means for sensing a voltage drop across the diode resulting from the power-consuming load, said diode voltage sensor includes means for outputting a trigger signal to said comparator circuit, and said comparator circuit includes means for outputting a control signal to said means for supplying in response to said trigger signal from said diode voltage sensor.

12. A device as set forth in claim 8, wherein said means for supplying includes an inverter/load driver circuit.

13. A method for measuring battery capacity over a predetermined range of temperatures and battery voltages, comprising the steps of:

(a) providing a battery system having at least one battery in electrical connection with a protection diode and a fuse;

(b) electrically attaching a power-discharge sensing circuit to the battery system, the power-discharge sensing circuit adapted to monitor the amount of power dissipated by a battery; and (c) electrically attaching a sleep circuit between the power-discharge sensing circuit and the battery system, the sleep circuit monitoring the battery system to control the power-discharge sensing circuit to reduce the amount of power consumed by the power-discharge sensing circuit regardless of the existence of a load on the battery system.

14. A method for controlling the amount of power required to continuously monitor a power-discharge sensing circuit attached to a battery system, comprising the steps of:

(a) electrically attaching a sleep circuit between the power-discharge sensing circuit and the battery system; and (b) allowing the sleep circuit to continuously monitor voltage changes across an existing protection diode of the battery system and control the power-discharge sensing circuit to significantly diminish the amount of power from the battery system required by the power-discharge sensing circuit to operate.

* * * * *